US006569924B2

(12) United States Patent
Shendy et al.

(10) Patent No.: US 6,569,924 B2
(45) Date of Patent: May 27, 2003

(54) SOLUBILIZED DEFOAMERS FOR CEMENTITIOUS COMPOSITIONS

(75) Inventors: Samy Shendy, Cuyahoga Falls, OH (US); Jeffrey R. Bury, Macedonia, OH (US); John J. Luciano, Russell, OH (US); Thomas M. Vickers, Jr., Concord Township, OH (US)

(73) Assignee: MBT HoldingAG, Zurich (CH)

( * ) Notice: Subject to any disclaimer, the term of this patent is extended or adjusted under 35 U.S.C. 154(b) by 0 days.

(21) Appl. No.: 09/732,380

(22) Filed: Dec. 7, 2000

(65) Prior Publication Data

US 2002/0107310 A1 Aug. 8, 2002

Related U.S. Application Data

(60) Provisional application No. 60/170,062, filed on Dec. 10, 1999.

(51) Int. Cl.⁷ ................................................ C08K 3/00
(52) U.S. Cl. ................................................ 524/5; 524/4
(58) Field of Search ........................................ 524/4, 5

(56) References Cited

U.S. PATENT DOCUMENTS

| | | |
|---|---|---|
| 4,209,336 A | 6/1980 | Previte |
| 4,948,429 A | 8/1990 | Arfaei |
| 5,085,708 A | 2/1992 | Moriya et al. |
| 5,156,679 A | 10/1992 | Gartner et al. |
| 5,158,996 A | 10/1992 | Valenti |
| 5,162,402 A | 11/1992 | Ogawa et al. |
| 5,348,993 A | 9/1994 | Daeumer et al. |
| 5,358,566 A | 10/1994 | Tanaka et al. |
| 5,393,343 A | 2/1995 | Darwin et al. |
| 5,494,516 A | 2/1996 | Drs et al. |
| 5,583,183 A | 12/1996 | Darwin et al. |
| 5,609,681 A | 3/1997 | Drs et al. |
| 5,612,396 A | 3/1997 | Valenti et al. |
| 5,633,298 A | 5/1997 | Arfaei et al. |
| 5,643,978 A | 7/1997 | Darwin et al. |
| 5,660,626 A | 8/1997 | Ohta et al. |
| 5,661,206 A | 8/1997 | Tanaka et al. |
| 5,665,158 A | 9/1997 | Darwin et al. |
| 5,668,195 A | 9/1997 | Leikauf |
| 5,670,578 A | 9/1997 | Shawl |
| 5,674,929 A | 10/1997 | Melbye |
| 5,703,174 A | 12/1997 | Arfaei et al. |
| 5,725,657 A | 3/1998 | Darwin et al. |
| 5,728,207 A | 3/1998 | Arfaei et al. |
| 5,753,744 A | 5/1998 | Darwin et al. |
| 5,798,425 A | 8/1998 | Albrecht et al. |
| 5,840,114 A | 11/1998 | Jeknavorian et al. |
| 5,912,284 A | 6/1999 | Hirata et al. |
| 6,008,275 A | 12/1999 | Moreau et al. |
| 6,083,184 A | 7/2000 | Leikauf et al. |
| 6,133,347 A | 10/2000 | Vickers et al. |
| 6,136,950 A | 10/2000 | Vickers et al. |

FOREIGN PATENT DOCUMENTS

| | | |
|---|---|---|
| DE | 43 24 334 A1 | 1/1994 |
| EP | 0 342 609 A2 | 11/1989 |
| EP | 0753488 A2 | 1/1997 |
| EP | 0930279 A1 | 7/1999 |
| EP | 0930321 A2 | 7/1999 |
| FR | 2 760 004 A1 | 8/1998 |
| GB | 2280180 | 1/1995 |
| JP | 02-252643 A | 10/1990 |
| WO | WO 94/05896 A1 | 3/1994 |
| WO | WO 98 31643 A | 7/1998 |

OTHER PUBLICATIONS

Chemical Abstracts, vol. 118, No. 4, Jan. 25, 1993 Columbus, Ohio, USA, Abstract No. 26621. Self–leveling cement composition with good flowability for floors.

*Primary Examiner*—Peter Szekely
(74) *Attorney, Agent, or Firm*—Renner, Kenner, Greive, Bobak, Taylor & Weber

(57) ABSTRACT

Solubilizing agents are mixed with water insoluble defoamers and a dispersant for cementitious compositions to provide an admixture for cementitious compositions that is stable over time. Suitable solubilizing agents include alkoxylated moieties or particles. A cementitious composition is provided that includes cement, water, a water insoluble defoamer, a dispersant for cementitious compositions, and a solubilizing agent that solubilizes the water insoluble defoamer. A method is provided for making a cementitious composition that includes mixing cement, water, a water insoluble defoamer, a dispersant for cementitious compositions, and a solubilizing agent that solubilizes the water insoluble defoamer.

27 Claims, No Drawings

SOLUBILIZED DEFOAMERS FOR CEMENTITIOUS COMPOSITIONS

CROSS REFERENCE TO RELATED APPLICATIONS

The present application claims priority from U.S. Provisional Patent Application No. 60/170,062, filed Dec. 10, 1999.

FIELD OF THE INVENTION

The present invention is directed to a combination of solubilizing agents and defoamers that are used in conjunction with a dispersant for cementitious compositions to control air contents in cementitious compositions. Particularly, the present invention is directed to a combination of solubilizing agents with water insoluble defoamers that are used in conjunction with dispersant for cementitious compositions to control air contents in cementitious compositions.

BACKGROUND OF THE INVENTION

Hydraulic cements, such as Portland cement, are used to form structural formations. Hydraulic cements can be mixed with aggregate to form mortars, which additionally include small aggregate and water, or concrete, which are mortars which additionally include large aggregate.

When working with hydraulic cements, it is desired to increase the slump properties of the initially formed hydraulic cement composition to aid in placement of the composition and to extend the period of flowability in order to provide working time to finish the placement of the structure. Admixtures can be added to hydraulic cement that increase the slump. Additionally, admixtures can be added that also reduce the amount of water required and to produce flowable cementitious compositions. The reduced water content increases the strength of the resulting hydraulic cement formation.

One admixture for increasing the flowability and reducing the water content is a polycarboxylate dispersant. Polycarboxylate dispersants are polymers with a carbon backbone with pendant side chains, wherein at least a portion of the side chains are attached to the backbone through a carboxyl group or an ether group. Polycarboxylate dispersants are very effective at dispersing and reducing the water content in hydraulic cements.

One drawback to polycarboxylate dispersants is that they have a tendency to entrain air in the cementitious composition during mixing While some entrained air may be desired for particular applications, such as providing freeze-thaw durability to the cement, an excess of entrained air is detrimental to the compressive strength of the resulting hydraulic formation.

Generally in the construction industry, non-air entrained cementitious compositions having an air content of less than 3% is desired, with an air content of less than 2% being preferred. Air entraining admixtures are sometimes used to provide purposeful air contents of 5–8% which improves the freeze thaw durability of the cementitious mixture. When this is the case, it is desirable to be able to adjust the air content by changing the air entrainer dosage and to have the resulting air remain stable over time.

To overcome the excess entraining of air in cementitious compositions, defoamers have been added to the cementitious mix to reduce the air content to a desired level. Defoamers typically have been included with the polycarboxylate admixture. However, the defoamers used in the prior art have been non-water-soluble compositions used alone. The problem with non-water-soluble defoamers is that they give an inadequate long term storage stability to the admixture resulting in phase separation. The polycarboxylate dispersant is generally a water soluble dispersant. When a non-water-soluble defoamer is used in conjunction with a water soluble dispersant, the mixture separates over time. This requires that the mixture be mixed prior to use. Also, some insoluble defoamers can cause unpredictable air contents over time.

Commercial defoamers typically contain a mixture of materials. The major part is an oil or organic liquid (up to 95 parts by weight), small particulate (up to 15 parts by weight), and a surfactant (up to 5 parts by weight).

Another technique used in the prior art has been the grafting of the defoamer onto the dispersant molecule.

The prior art, however, has not shown the combination of a defoamer that is not chemically combined with the polycarboxylate dispersant that is used in conjunction with a solubilizing agent.

What is needed in the industry is a combination of a water insoluble defoamer, a dispersant for cementitious compositions, and a solubilizing agent that solubilizes the water insoluble defoamer that produces controllable air contents in non-air entrained and air entrained cementitious compositions.

It is therefore an object of the invention to provide a combination of a water insoluble defoamer, a dispersant for cementitious compositions, and a solubilizing agent that solubilizes the water insoluble defoamer that produces controllable air contents in non-air entrained and air entrained cementitious compositions.

It is another object of the invention to provide an admixture containing a dispersant for cementitious compositions, a solubilizing agent, and a water insoluble defoamer that is stable over time.

SUMMARY OF THE INVENTION

Solubilizing agents can be combined with water insoluble defoamers and dispersants for cementitious compositions to provide an admixture for cementitious compositions that is stable over time. The resulting admixture has long term storage stability so that the admixture does not need to be mixed prior to use at the work site.

The present invention provides an admixture for cementitious compositions comprising a water insoluble defoamer, a dispersant for cementitious compositions, and a solubilizing agent that solubilizes the water insoluble defoamer.

The present invention also provides a cementitious composition comprising cement, water, a water insoluble defoamer, a dispersant for cementitious compositions, and a solubilizing agent that solubilizes the water insoluble defoamer.

The present invention also provides a method of making a cementitious composition comprising mixing cement, water, a water insoluble defoamer, a dispersant for cementitious compositions, and a solubilizing agent that solubilizes the water insoluble defoamer.

DETAILED DESCRIPTION OF THE INVENTION

The term solubilizing agent refers to a material that can solubilize insoluble material. Solubilization is defined as a mode of bringing into solution substances that are otherwise insoluble in a given medium. Solubilization involves the previous presence of a colloidal (organized) solution whose particles take up and incorporate within or upon themselves the otherwise insoluble material. (M. E. L. McBain and E. Hutchinson, Solubilization and Related Phenomena, Academic Press, New York (1955). Generally, a solubilizing agent is a solubilizing surfactant.

The term dispersant for cementitious compositions throughout this specification includes polycarboxylate dispersants and oligomeric dispersants.

The term polycarboxylate dispersant throughout this specification refers to polymers with a carbon backbone with pendant side chains, wherein at least a portion of the side chains are attached to the backbone through a carboxyl group or an ether group. The term dispersant is also meant to include those chemicals which also function as a plasticizer, water reducer, fluidizer, antiflocculating agent, or superplasticizer for cementitious compositions. Examples of polycarboxylate dispersants can be found in U.S. Pat. Nos. 6,267,814, 6,290,770, 6,310,143, 6,187,841, 5,158,996, 6,008,275, 6,136,950, 6,284,867, 5,609,681, 5,494,516; 5,674,929, 5,660,626, 5,668,195, 5,661,206, 5,358,566, 5,162,402, 5,798,425, 5,612,396, 6,063,184, 5,912,284, 5,840,114, 5,753,744, 5,728,207, 5,725,657, 5,703,174, 5,665,158, 5,643,978, 5,633,298, 5,583,183, 5,393,343, which are incorporated herein by reference.

The term oligomeric dispersant throughout this specification refers to oligomers that are a reaction product of a component A, optionally component B, and component C that are defined in U.S. Pat. Nos. 6,133,347, 6,451,881, and U.S. Ser. NO. 09/629,724 filed on Jul. 31, 2000, which are hereby incorporated by reference.

The dispersants used in combination with the water insoluble defoamer and the solubilizing agent that solubilizes the water insoluble defoamer are at least one of:

a) a dispersant of Formula (I)

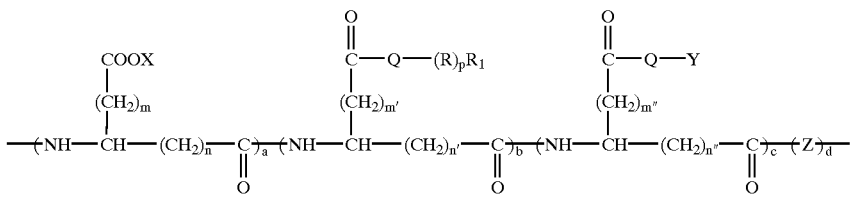

wherein in Formula (I)
X is at least one of hydrogen, an alkali earth metal ion, an alkaline earth metal ion, ammonium ion, and amine;
R is at least one of $C_1$ to $C_6$ alkyl(ene)ether and mixtures thereof and $C_1$ to $C_6$ alkyl(ene)imine and mixtures thereof;
Q is at least one of oxygen, NH, and sulfur;
p is a number from 1 to about 300 resulting in at least one of a linear side chain and branched side chain;
$R_1$ is at least one of hydrogen, $C_1$ to $C_{20}$ hydrocarbon, and functionalized hydrocarbon containing at least one of —OH, —COOH, an ester or amide derivative of —COOH, sulfonic acid, an ester or amide derivative of sulfonic acid, amine, and epoxy;
Y is at least one of hydrogen, an alkali earth metal ion, an alkaline earth metal ion, ammonium ion, amine, a hydrophobic hydrocarbon and polyalkylene oxide moiety that functions as a defoamer;
m, m', m", n, n', and n" are each independently 0 or an integer between 1 and about 20;
Z is a moiety containing at least one of i) at least one amine and one acid group, ii) two functional groups capable of incorporating into the backbone selected from the group consisting of dianhydrides, dialdehydes, and di-acid-chlorides, and iii) an imide residue; and
wherein a, b, c, and d reflect the mole fraction of each unit wherein the sum of a, b, c, and d equal one, wherein a, b, c, and d are each a value greater than or equal to zero and less than one, and at least two of a, b, c, and d are greater than zero.

b) a dispersant of Formula (II)

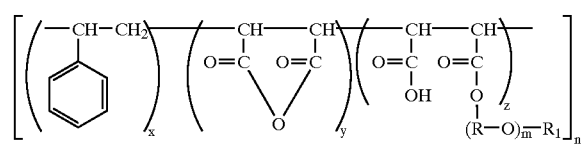

wherein in Formula (II):
R is a $C_{2-6}$ alkylene radical;
$R_1$ is a $C_{1-20}$ alkyl, $C_{6-9}$ cycloalkyl or phenyl group;
x, y, and z are number from 0.01 to 100;
m is a number from 1 to 100; and
n is a number from 10 to 100;
preferably, the ratio of x to (y+z) is from 1:10 to 10:1 inclusive, the ratio of z:y is from 3:1 to 100:1, and m+n=15–100;

c) a dispersant of Formula (III)

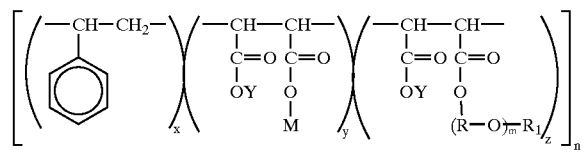

wherein in Formula (III):
M is hydrogen or the residue of a hydrophobic polyalkylene glycol or polysiloxane;
Y is hydrogen, an alkali or alkaline earth metal ion, ferrous ion, aluminum ion, (alkanol)ammonium ion, or (alkyl)ammonium ion;
R is a $C_{2-6}$ alkylene radical;
$R_1$ is a $C_{1-20}$ alkyl, $C_{6-9}$ cycloalkyl, or phenyl group;
x, y, and z are numbers from 1 to 100;

preferably, the ratio of a to (b+c) is from 1:10 to 10:1 inclusive, the ratio of c:b is from 5:1 to 100:1, and m+n=15–100;

d) a dispersant comprising at least one polymer or a salt thereof having the form of a copolymer of
  i) a maleic anhydride half-ester with a compound of the formula RO(AO)$_m$H, wherein R is a C$_1$–C$_{20}$ alkyl group, A is a C$_{2-4}$ alkylene group, and m is an integer from 2–16; and
  ii) a monomer having the formula CH$_2$=CHCH$_2$—(OA)$_n$OR, wherein n is an integer from 1–90 and R is a C$_{1-20}$ alkyl group;

e) a reaction product formed by reacting a polycarboxylic acid with a nitrogeneous acrylic polymer;

f) a dispersant obtained by copolymerizing 5 to 98% be weight of an (alkoxy)polyalkylene glycol mono(meth) acrylic ester type monomer (a) represented by the following general formula (1):

wherein R$_1$ stands for hydrogen atom or a methyl group, R$_2$O for one species or a mixture of two or more species of oxyalkylene group of 2 to 4 carbon atoms, providing two or more species of the mixture may be added either in the form of a block or in a random form, R$_3$ for a hydrogen atom or an alkyl group of 1 to 5 carbon atoms, and m is a value indicating the average addition mol number of oxyalkylene groups that is an integer in the range of 1 to 100, 95 to 2% by weight of a (meth)acrylic acid type monomer (b) represented by the above general formula (2), wherein R$_4$ and R$_5$ are each independently a hydrogen atom or a methyl group, and M$_1$ for a hydrogen atom, a monovalent metal atom, a divalent metal atom, an ammonium group, or an organic amine group, and 0 to 50% by weight of other monomer (c) copolymerizable with these monomers, provided that the total amount of (a), (b), and (c) is 100% by weight;

g) a graft polymer that is a polycarboxylic acid or a salt thereof, having side chains derived from at least one species selected from the group consisting of oligoalkyleneglycols, polyalcohols, polyalkylene glycols, and derivatives thereof;

h) a styrene-maleic anhydride copolymer in free acid or salt form, wherein the copolymer consists of the following types and numbers of monomer units:

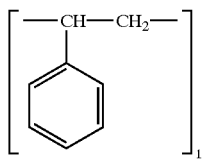 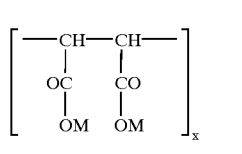

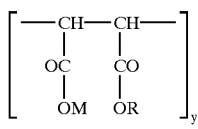

wherein:

M is selected from hydrogen, a cation and a residue of a hydrophobic polyalkylene glycol or polysiloxane;

R is the residue of a methylpoly(ethylene) glycol of weight average molecular weight 900–2000;

x=0.35–0.75; and y=0.25–0.65;

i) a reaction product of component A, optionally component B, and component C; wherein each component A is independently a nonpolymeric, functional moiety that adsorbs onto a cementitious particle, and contains at least one residue derived from a first component selected from the group consisting of phosphates, phosphonates, phosphinates, hypophosphites, sulfates, sulfonates, sulfinates, alkyl trialkoxy silanes, alkyl triacyloxy silanes, alkyl triaryloxy silanes, borates, boronates, boroxines, phosphoramides, amines, amides, quaternary ammonium groups, carboxylic acids, carboxylic acid esters, alcohols, carbohydrates, phosphate esters of sugars, borate esters of sugars, sulfate esters of sugars, salts of any of the preceding moieties, and mixtures thereof; wherein component B is an optional moiety, where if present, each component B is independently a nonpolymeric moiety that is disposed between the component A moiety and the component C moiety, and is derived from a second component selected from the group consisting of linear saturated hydrocarbons, linear unsaturated hydrocarbons, saturated branched hydrocarbons, unsaturated branched hydrocarbons, alicyclic hydrocarbons, heterocyclic hydrocarbons, aryl, phosphoester, nitrogen containing compounds, and mixtures thereof; and wherein component C is at least one moiety that is a linear or branched water soluble, nonionic polymer substantially non-adsorbing to cement particles, and is selected from the group consisting of poly(oxyalkylene glycol), poly(oxyalkylene amine), poly(oxyalkylene diamine), monoalkoxy poly(oxyalkylene amine), monoaryloxy poly(oxyalkylene amine), monoalkoxy poly(oxyalkylene glycol), monoaryloxy poly (oxyalkylene glycol), poly(vinyl pyrrolidones), poly (methyl vinyl ethers), poly(ethylene imines), poly (acrylamides), polyoxazoles, and mixtures thereof;

j) a dispersant of Formula (IV):

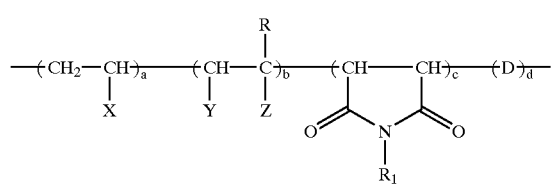

-continued

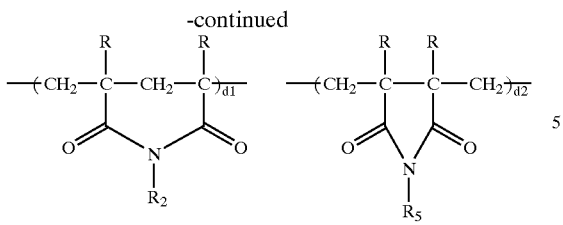

wherein in Formula (IV):
D=a component selected from the group consisting of the structure d1, the structure d2, and mixtures thereof;
X=H, $CH_3$, $C_2$ to $C_6$ Alkyl, Phenyl, Substituted Phenyl such as p-Methyl Phenyl, Sulfonated Phenyl;
Y=H, —COOM;
R=H, $CH_3$;
Z=H, —$SO_3M$, —$PO_3M$, —COOM, —$OR_3$, —$COOR_3$, —$CH_2OR_3$, —$CONHR_3$, —CONHC$(CH_3)_2$ $CH_2SO_3M$, —COO$(CHR_4)_n$OH where n=2 to 6;
$R_1, R_2, R_3, R_5$ are each independently —$(CHRCH_2O)_m$ $R_4$ random copolymer of oxyethylene units and oxypropylene units where m=10 to 500 and wherein the amount of oxyethylene in the random copolymer is from about 60% to 100% and the amount of oxypropylene in the random copolymer is from 0% to about 40%;
$R_4$=H, Methyl, $C_2$ to about $C_6$ Alkyl, about $C_6$ to about $C_{10}$ aryl;
M=H, Alkali Metal, Alkaline Earth Metal, Ammonium, Amine, Substituted Amine such as triethanol amine, Methyl, $C_2$ to about $C_6$ Alkyl;
a=0 to about 0.8, preferably 0 to about 0.6, and most preferably 0 to about 0.5;
b=about 0.2 to about 1.0, preferably about 0.3 to about 1.0, and most preferably about 0.4 to about 1.0;
c=0 to about 0.5, preferably 0 to about 0.3, and most preferably 0 to about 0.1;
d=0 to about 0.5, preferably 0 to about 0.3, and most preferably 0 to about 0.1; and
wherein a, b, c, and d represent the mole fraction of each unit and the sum of a, b, c, and d is 1.0;
k) a dispersant of Formula (V):

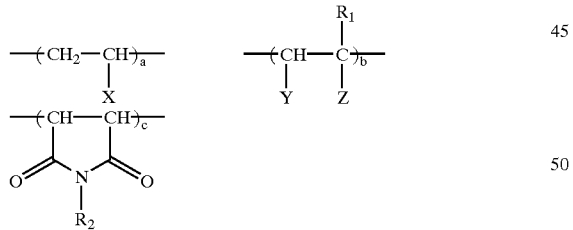

wherein in Formula (V):
the "b" structure is one of a substituted carboxylic acid monomer, a substituted ethylenically unsaturated monomer, and maleic anhydride wherein an acid anhydride group (—CO—O—CO—) is formed in place of the groups Y and Z between the carbon atoms to which the groups Y and Z are bonded respectively, and the "b" structure must include at least one moiety with a pendant ester linkage and at least one moiety with a pendant amide linkage;
X=H, $CH_3$, $C_2$ to $C_6$ Alkyl, Phenyl, or Substituted Phenyl such as p-Methyl Phenyl, p-Ethyl Phenyl, Carboxylated Phenyl, Sulfonated Phenyl and the like;

Y=H, —COOM, —COOH, or W;
W=a hydrophobic defoamer represented by the formula $R_5O—(CH_2CH_2O)_s—(CH_2C(CH_3)HO)_t—(CH_2CH_2O)_u$ where s, t, and u are integers from 0 to 200 with the proviso that t>(s+u) and wherein the total amount of hydrophobic defoamer is present in an amount less than about 10% by weight of the derivatized polycarboxylate dispersant;
Z=H, —COOM, —$OR_3$, —$COOR_3$, —$CH_2OR_3$, or —$CONHR_3$;
$R_1$=H, or $CH_3$;
$R_2, R_3$, are each independently a random copolymer of oxyethylene units and oxypropylene units of the general formula —$(CH(R_1)CH_2O)_mR_4$ where m=10 to 500 and wherein the amount of oxyethylene in the random copolymer is from about 60% to 100% and the amount of oxypropylene in the random copolymer is from 0% to about 40%;
$R_4$=H, Methyl, or $C_2$ to $C_8$ Alkyl;
$R_5$=$C_1$ to $C_{18}$ alkyl or $C_6$ to $C_{18}$ alkyl aryl;
M=Alkali Metal, Alkaline Earth Metal, Ammonia, Amine, Substituted Amine such as monoethanol amine, diethanol amine, triethanol amine, morpholine, imidazole and the like;
a=0.01–0.8, preferably 0.01–0.6, and most preferably 0.01–0.5;
b=0.2–0.99, preferably 0.3–0.99, and most preferably 0.4–0.99;
c=0–0.5, preferably 0–0.3, and most preferably 0–0.1; and
wherein a, b, c represent the mole fraction of each unit and the sum of a, b, and c, is 1;
l) a random copolymer corresponding to the following Formula (VI) in free acid or salt form having the following types and numbers of monomer units:

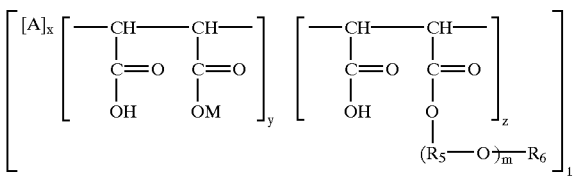

wherein A is selected from the moieties (i) and (ii)
(i) —$CR_1R_2$—$CR_3R_4$—

(ii)
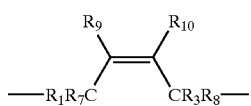
—$R_1R_7C$   $CR_3R_8$— wherein $R_1$ and $R_3$ are selected from substituted benzene, $C_{1-8}$ alkyl, $C_{2-8}$ alkenyl, $C_{2-8}$ alkylcarbonyl, $C_{1-8}$ alkoxy, carboxyl, and hydrogen, or $R_1$ and $R_3$ can together with $R_2$ and/or $R_4$ form a ring; and $R_2$ and $R_4$ are selected from the group consisting of hydrogen and $C_{1-4}$ alkyl; $R_7$, $R_8$, $R_9$, and $R_{10}$ are individually selected from the group consisting of hydrogen, $C_{1-6}$ alkyl, or $R_1$ and $R_3$ together with $R_7$ and/or $R_8$, $R_9$, and $R_{10}$ form a continuous $C_{2-8}$ hydrocarbon chain joining the carbon atoms to which they are attached, the hydrocarbon chain optionally having at least one anionic group, preferably sulphonic;
M is selected from the group consisting of hydrogen, and the residue of a hydrophobic polyalkylene glycol or a polysiloxane, with the proviso that when A is (ii) and M is the residue of a hydrophobic polyalkylene glycol, M must be different from the group —$(R_5O)_m R_6$;

$R_5$ is a $C_{2-8}$ alkylene radical;

$R_6$ is selected from the group consisting of $C_{1-20}$ alkyl, $C_{6-9}$ cycloalkyl and phenyl;

n, x, and z are numbers from 1 to 100;

y is 0 to 100;

m is 2 to 1000;

the ratio of x to (y+z) is from 1:10 to 10:1 and the ratio of y:z is from 5:1 to 1:100;

m) a copolymer based on oxyalkyleneglycol-alkenyl ethers and unsaturated dicarboxylic acid derivatives, comprising:

i) 10 to 90 mol % of component of the formula Ia and or Ib:

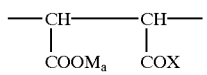

Ia

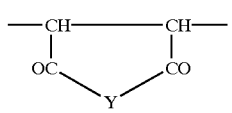

Ib wherein M is a hydrogen atom, a mono- or divalent metal cation, an ammonium ion or an organic amine residue, a is 1, or when M is a divalent metal cation is ½, X is —$OM_a$ or —O—$(C_mH_{2m}O)_n$—$R_1$, in which $R_1$ is a hydrogen atom, an aliphatic hydrocarbon radical containing from 1 to 20 carbon atoms, a cycloaliphatic hydrocarbon radical containing 5 to 8 carbon atoms or an optionally substituted aryl radical containing 6 to 14 carbon atoms, m is 2 to 4, n is 0 to 100, —$NHR_2$ and/or —$N(R_2)_2$, in which $R_2=R_1$ or —CO—$NH_2$, and Y is an oxygen atom or —$NR_2$;

ii) 1 to 89 mol % of components of the general formula:

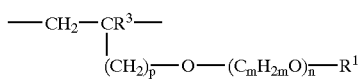

wherein $R_3$ is a hydrogen atom or an aliphatic hydrocarbon radical containing from 1 to 5 carbon atoms, p is 0 to 3, and $R_1$, m, and n have the above-given meanings, and iii) 0.1 to 10 mol % of components of the general formulae:

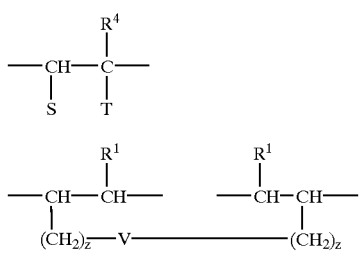

wherein S is a hydrogen atom or —$COOM_a$ or —$COOR_5$, T is —$COOR_5$, —W—$R_7$, —CO—[—NH—(CH2)3—]$_s$—W—$R_7$, —CO—O—$(CH_2)_z$—W—$R_7$, a radical of the general formula:

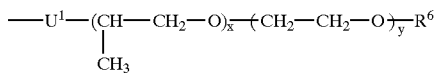

or —$(CH_2)_z$—V—$(CH_2)_z$—CH=CH—$R_1$, or when S is —$COOR_5$ or —$COOM_a$, $U_1$ is —CO—NHM—, —O— or —$CH_2O$, $U_2$ is —NH—CO—, —O— or —$OCH_2$, V is —O—CO—$C_6H_4$—CO—O— or —W—, and W is

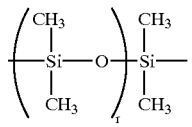

R4 is a hydrogen atom or a methyl radical, R5 is an aliphatic hydrocarbon radical containing 3 to 20 carbon atoms, a cycloaliphatic hydrocarbon radical containing 5 to 8 carbon atoms or an aryl radical containing 6 to 14 carbon atoms, $R_6=R_1$ or

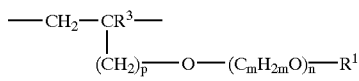

$R_7 = R_1$ or

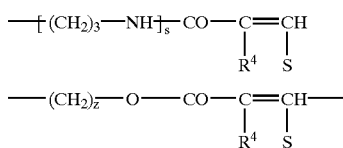

r is 2 to 100, s is 1 or 2, x is 1 to 150, y is 0 to 15 and z is 0 to 4.

As used herein, the term cement refers to any hydraulic cement. Hydraulic cements are materials which set when mixed with water. Suitable examples of hydraulic cements include, but are not limited to, portland cement, masonry cement, alumina cement, refractory cement, magnesia cement, calcium sulfoaluminate cement, oil well cement, and mixtures thereof.

Pastes are defined as mixtures composed of a hydraulic cement binder, either alone or in combination with pozzolans such as fly ash, silica fume, or blast furnace slag, and water. Mortars are defined as pastes that additionally include fine aggregate. Concretes additionally include coarse aggregate.

A solubilizing agent can be combined with a water insoluble defoamer and a dispersant for cementitious compositions to form an admixture for cementitious compositions. The combination of a solubilizing agent with a water insoluble defoamer and a dispersant for cementitious compositions provides an admixture that is stable over time in that there is little or no phase separation between the dispersant and defoamers.

Without being limited to theory, it is theorized that some combinations of a solubilizing agent with a water insoluble defoamer form a microemulsion. A microemulsion is a single, thermodynamically stable, equilibrium phase; as compared to a macroemulsion, which is a dispersion of droplets that contain two or more phases, which are liquids or liquid crystals. (Smith, D. "Microemulsions", *Kirk Othmer Encyclopedia of Chemical Technology*, 4th ed 1999.) Emulsions typically are opaque, unstable, and macrodisperse systems of 0.5 to 10 micron droplet size. Microemulsions are typically transparent, oil in water systems stabilized by an interfacial layer of surfactants and have a particle size of about 0.01 to about 0.05 microns. The smaller particle size provides for the optical transparency. Further definition of microemulsions can be found in Microemulsions: Theory and Practice, by L. M. Prince, Academic Press, New York (1977).

Solubilizing agents can increase the total aqueous solubilization of oil in an aqueous phase. When a sufficient amount of solubilizer is present in a solution (reaching the critical micelle concentration), the solubilizer molecules aggregate into micelles. The micelle-water partition coefficient and the molar solubilization ratio can characterize the degree of solubility enhancement achieved by a solubilizing agent. The solubilization of the defoamer increases after the solubilizing agent reaches the critical micelle concentration. The defoamer diffuses through the aqueous phase to the micelles and dissolves in the core of the micelle. As more solubilizer is added, the shape of the micelles will change to cylinder form. As even more solubilizer is added the shape will eventually change to lamellar. However, the number of micelles will remain about the same throughout these changes.

Solubilized refers to the aggregation or self assembly micellization. Soluble refers to the interaction of an individual molecule with water.

Solubilizing agents according to the present invention preferably are at least partially effective themselves as defoamers for cementitious compositions.

The amount of the dispersant for cementitious compositions that is present in a cementitious mixture ranges from about 0.01 wt. % to about 2.0 wt. % based on the weight of cement. Preferably, the amount of dispersant for cementitious compositions that is present in a cementitious mixture ranges from about 0.05 wt. % to about 0.5 wt. % based on the weight of cement.

The amount of solubilizing agent that is present in the admixture is at least the amount sufficient to obtain a stable microemulsion. Preferably the amount of solubilizing agent that is present in the admixture is from about 0.25 wt. % to about 40 wt. % based on the weight of the polycarboxylate dispersant.

The amount of water insoluble defoamer that is present in the admixture ranges from about 0.01% to about 25% based on the weight of the dispersant for cementitious compositions. Preferably, the amount of water insoluble defoamer that is present in the admixture ranges from about 0.25% to about 10% based on the weight of the dispersant for cementitious compositions.

The ratio of insoluble defoamer to solubilizing agent ranges from an amount effective to solubilize the insoluble defoamer up to about 100, preferably up to about 0.27.

Examples of water insoluble defoamers useful to control the air content in cementitious compositions include, but are not limited to, chemicals based on mineral or vegetable oils, fats and oils, fatty acids, fatty acid esters, any chemical with —OH (hydroxyl) functionality (such as alcohols, particularly fatty alcohols), amides, phosphoric esters, metal soaps, silicones, oxyalkylenes, polymers containing propylene oxide moieties, liquid hydrocarbons, and acetylenic diol derivatives.

Suitable examples of the water insoluble defoamers useful to control the air content in cementitious compositions include DYNOL™ 604, SURFYNOL® 440, nonyl phenol, castor oil, and polypropylene oxide.

Further examples of water insoluble defoamers include the following: kerosene, liquid paraffin, animal oil, vegetable oil, sesame oil, castor oil, alkylene oxide adducts thereof, oleic acid, stearic acid and alkylene oxide adducts thereof, diethylene glycol laurate, glycerin monorecinolate, alkenyl succinic acid derivatives, sorbitol monolaurate, sorbitol trioleate, polyoxyethylene monolaurate, polyoxyethylene sorbitol monolaurate, natural wax, linear or branched fatty alcohols and their alkoxylated derivatives, octyl alcohol, hexadecyl alcohol, acetylene alcohol, glycols, polyoxyalkylene glycol, polyoxyalkylene amide, acrylate polyamine, tributyl phosphate, sodium octyl phosphate; aluminum stearate, calcium oleate, silicone oil, silicone paste, silicone emulsion, organic modified polysiloxane, fluorosilicone oil; and polyoxyethylene polyoxypropylene adducts. To the extent that the defoamers in the preceding list contain alkylene oxides, reference is made to those that are water insoluble.

Examples of the solubilizing agent include, but are not limited to, compounds of alkoxylated R, carboxylated alkoxylated R, sulfated alkoxylated R, sulfonated alkoxylated R, styrene-maleic copolymer, and derivatized styrene-maleic copolymer. Where R could be: a hydrocarbon, sorbitan, polypropylene oxide, fatty acid, fatty alcohol, isononanol, $C_8$–$C_{22}$ alkyl amine, styrene maleic copolymer, or derivatized styrene-maleic copolymer. The hydrocarbon preferably contains from 1 to about 22 carbons, and the fatty acid and fatty alcohol preferably contain from about 8 to about 22 carbon atoms. Preferred alkoxylates are molecules containing ethylene oxide and/or propylene oxide. Most preferred alkoxylates are molecules containing ethylene oxide. The solubilizing agents can be used in combination with other solubilizing agents. Preferred derivatized groups for the derivatized styrene-maleic copolymers include, but are not limited to, sulfonated, hydroxy alkyl ester, and dimethyl amino propyl. A preferred derivatized styrene-maleic copolymer is alkoxylated styrene-maleic copolymer.

Preferred alkyl-ether sulfonates are given by the following formula: $R_1$—$(OCH_2CH_2)_n$—$SO_3M$, wherein $R_1$ is an alkyl with 6 to 18 carbon atoms, and n is an integer from 1 to 15. Preferred alkyl-ether sulfonates are AVANEL products from BASF. AVANEL S-74 has $R_1$ as $C_8$ alkyl and n=3 in the above formula. AVANEL S-70 has $R_1$ as $C_{12}$ alkyl and n=7. AVANEL S-150CG has $R_1$ as $C_{15}$ alkyl and n=15. AVANEL S-74 is most preferred.

Preferred alkyl-ether carboxylates are $R_1O(CHR_2CH_2O)_n$ $CH_2CH_2COOM$, wherein $R_1$ is a $C_4$–$C_{18}$ hydrocarbon, $R_2$=H or $CH_3$, n=1–30, m=H, Na, K, Li, Ca, Mg, amine, or ammonia. Preferred alkyl-ether carboxylates are available from Hickson DanChem under the tradename NEODOX.

Preferred styrene-maleic copolymers are given by the following formula:

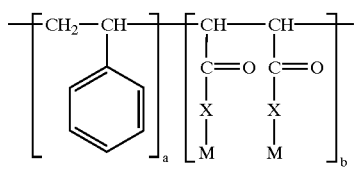

wherein M is independently at least one of H, Na, K, Ca, Mg, alkyl, substituted alkyl, aryl, substituted aryl, or an oxyalkylene group $(R_2O)_n$—$R_3$, wherein $R_2$ is a $C_2$-$C_4$ alkylene group, such as ethylene, propylene, or butylene, and $R_3$ is H or $C_1$-$C_{22}$ alkyl group, alkyl-aryl group, or aryl group, and n=1–500. X can be —O— or —NHR$_4$. When X is —O—, an anhydride can be formed, and when X is —NHR$_4$, and imide ring. R4 is H, alkyl, substituted alkyl, aryl, substituted aryl, or an high oxyalkylene group $(R_2O)_n$—$R_3$. A preferred substituted alkyl is hydroxy ethyl and dimethyl amino propyl. A preferred substituted aryl is a residue derived from nonyl phenol. Preferably the molar ratio of styrene (a) to maleic (b) is greater than 1:1. More preferably, the styrene:maleic ratio is ≧2:1. Preferably, a and b are numbers such that the copolymer has a number average molecular weight from about 1,000 to about 20,000.

Specific examples of these types of solubilizing agents capable of controlling the air content in cementitious compositions are given below. Note, the amount of ethylene oxide should be selected so that the products below are water soluble.

PLURONIC® products are block copolymers of ethylene oxide (EO) and propylene oxide (PO). PLURONIC® products are available from BASF. Standard PLURONIC® products are EO-PO-EO based copolymers. PLURONIC® products with an R in the product name are PO-EO-PO based. The basic structures are given below:

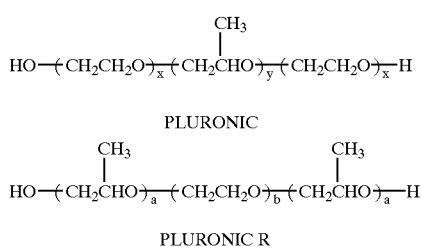

Specific PLURONIC® product names are based on the EO and PO content and the molecular weight. The specific product name indicates the molecular weight of the hydrophobe, the propylene oxide, and the percent of the hydrophile, the ethylene oxide, in the molecule. The first two digits multiplied by 300 gives the molecular weight, and the last digit multiplied by 10 gives the percent hydrophile. For PLURONIC® R products, the numbers before the R multiplied by 100 gives the molecular weight of the combined PO blocks, and the number after the R multiplied by 10 gives the EO percentage. The solubility of the polymer is based on the HLB value. Generally, as the HLB value increases the ability of the polymer to be solubilized by making micelles increases.

The SURFYNOL® 400 series of products are acetylenic diols. The last two digits of the product number indicate the percentage of ethylene oxide by weight. Some of the SURFYNOL® 400 series of products are water insoluble; however, SURFYNOL® 465 and SURFYNOL® 485 are water soluble. The basic structure of SURFYNOL® 400 series products is given by the following structure:

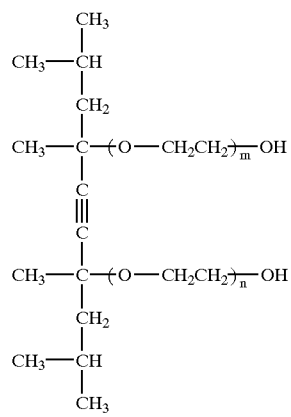

TERGITOL® NP, from Union Carbide Company, is a polymer of ethylene oxide and nonylphenol (ethoxylated nonylphenol) and is represented by the following structure:

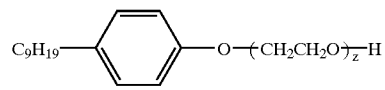

JEFFOX® chemical, from Huntsman Chemical Company, are mono alkyl polyoxyalkylenes. Preferred is a 50/50 ethylene oxide/propylene oxide random polymer with a mono-butyl terminal group [Bu-O-(PO)$_x$(EO)$_x$-H].

One measure of a product's emulsification characteristics is the hydrophile lipophile balance (HLB). As the HLB increases, there are more hydrophilic groups in the surfactant and the more the surfactant is water soluble. Generally, an HLB of 3–6 indicates a water in oil emulsifier, an HLB of 7–9 indicates a wetting agent, an HLB of 8–18 indicates an oil in water emulsifier, an HLB of 13–15 indicates a detergent, and an HLB of 15–22 indicates a solubilizer. The following references provide more information about HLB: *The Atlas HLB System*, 4$^{th}$ printing, Wilmington, Del., Atlas Chemical Industries, 1963; "Emulsions", *Ullmans's Encyclopedia of Industrial Chemistry*, 5$^{th}$ ed 1987; Fox, C., "Rationale for the Selection of Emulsifying Agents", *Cosmetics & Toiletries* 101.11 (1986), 25–44; Graciaa, A., J. Lachaise, and G. Marion, "A Study of the Required Hydrophile-Lipophile Balance for Emulsification", *Langmuir* 5 (1989):1215–1318; and Griffin, W. C. "Emulsions", *Kirk Othmer Encyclopedia of Chemical Technology*, 3$^{rd}$ ed 1979.

Generally, defoamers with an HLB up to 4 have strong defoaming properties. As the HLB value increases, the defoaming capabilities decrease and foaming abilities increase. In the present invention, the solubilizing agents generally have an HLB value ranging from about 5 to about 22.

Elevated temperature stability for any combination of insoluble defoamer and dispersant for cementitious compositions can be obtained by increasing the level of the solubilizing agent. For example, depending upon the insoluble defoamer level and the effectiveness of the solubilizing agent, a temperature increase from 25° C. to 45° C.

may possibly need a 10–20% increase in the amount of solubilizing agent to maintain a clear stable solution.

The admixture of the present invention can be used in combination with any other admixture or additive for cement. Other cement admixtures and additives include, but are not limited to, set retarders, set accelerators, air-entraining or air detraining agents, corrosion inhibitors, any other dispersants for cement, pigments, wetting agents, water soluble polymers, strength enhancing agents, rheology modifying agents, water repellents, and any other admixture or additive that does not adversely affect the properties of the admixture of the present invention.

Other dispersants for cement include, but are not limited to, calcium lignosulfonates, beta naphthalene sulfonates, sulfonated melamine formaldehyde condensates, any other chemical that functions as a dispersant or water reducer or superplasticizer for cement, and mixtures thereof.

Listed below are several examples of admixtures and additives that can be used with the present invention. U.S. Pat. No. 5,728,209 to Bury et al., which is incorporated herein by reference, contains a detailed description of different types of admixtures.

The term air entrainer includes any chemical that will entrain air in cementitious compositions. Air entrainers can also reduce the surface tension of a composition at low concentration. Air-entraining admixtures are used to purposely entrain microscopic air bubbles into concrete. Air-entrainment dramatically improves the durability of concrete exposed to moisture during cycles of freezing and thawing. In addition, entrained air greatly improves a concrete's resistance to surface scaling caused by chemical deicers. Air entrainment also increases the workability of fresh concrete while eliminating or reducing segregation and bleeding. Materials used to achieve these desired effects can be selected from salts of wood resin; (Vinsol resin); some synthetic detergents; salts of sulfonated lignin; salts of petroleum acids; salts of proteinaceous material; fatty and resinous acids and their salts; alkylbenzene sulfonates; and salts of sulfonated hydrocarbons. Air entrainers are added in an amount to yield a desired level of air in a cementitious composition. Generally, the amount of air entrainers in a cementitious composition ranges from about 0.2 to about 5.0 fluid ounces per hundred pounds of cement. But this can vary widely due to variations in materials, mix proportion, temperature, and mixing action.

Retarding, or delayed-setting, admixtures are used to retard, delay, or slow the rate of setting of concrete. They can be added to the concrete mix upon initial batching or sometime after the hydration process has begun. Retarders are used to offset the accelerating effect of hot weather on the setting of concrete, or delay the initial set of concrete or grout when difficult conditions of placement occur, or problems of delivery to the job site, or to allow time for special finishing processes or to aid in the reclamation of concrete left over at the end of the work day. Most retarders also act as water reducers and can also be used to entrain some air into concrete. Lignosulfonates, hydroxylated carboxylic acids, lignin, borax, gluconic, tartaric and other organic acids and their corresponding salts, phosphonates, certain carbohydrates and mixtures thereof can be used as retarding admixtures.

Air detrainers are used to decrease the air content in the mixture of concrete. Tributyl phosphate, dibutyl phthalate, octyl alcohol, water-insoluble esters of carbonic and boric acid, and silicones are some of the common materials that can be used to achieve this effect.

Alkali-reactivity reducers can reduce the alkali-aggregate reaction and limit the disruptive expansion forces in hardened concrete. Pozzolans (fly ash, silica fume), blast-furnace slag, salts of lithium and barium are especially effective.

Bonding admixtures are usually added to portland cement mixtures to increase the bond strength between old and new concrete and include organic materials such as rubber, polyvinyl chloride, polyvinyl acetate, acrylics, styrene butadiene copolymers, and other powdered polymers.

Water-reducing admixtures are used to reduce the amount of mixing water required to produce concrete of a certain slump, to reduce the ratio of water and cement, or to increase slump. Typically, water reducers will reduce the water content of the concrete mixture by approximately up to 15%.

Superplasticizers are high-range water reducers, or water-reducing admixtures. They are added to concrete to make high-slump, flowing concrete, and thus reduce the water-cement ratio. These admixtures produce large water reduction or great flowability without causing undue set retardation or entrainment of air in mortar or concrete. Among the materials that can be used as superplasticizers are sulfonated melamine formaldehyde condensates, sulfonated naphthalene formaldehyde condensates, certain organic acids, lignosulfonates, and/or blends thereof.

Natural and synthetic admixtures are used to color concrete for aesthetic and safety reasons. These coloring admixtures are usually composed of pigments and include carbon black, iron oxide, phthalocyanine, umber, chromium oxide, titanium oxide and cobalt blue.

Corrosion inhibitors in concrete serve to protect embedded reinforcing steel from corrosion due to its highly alkaline nature. The high alkaline nature of the concrete causes a passive and noncorroding protective oxide film to form on the steel. However, carbonation or the presence of chloride ions from deicers or seawater can destroy or penetrate the film and result in corrosion. Corrosion-inhibiting admixtures chemically arrest this corrosion reaction. The materials most commonly used to inhibit corrosion are calcium nitrite, sodium nitrite, sodium benzoate, certain phosphates or fluorosilicates, fluoroaluminates, amines, organic based water repelling agents, and related chemicals.

Dampproofing admixtures reduce the permeability of concrete that have low cement contents, high water-cement ratios, or a deficiency of fines in the aggregate. These admixtures retard moisture penetration into dry concrete and include certain soaps, stearates, and petroleum products.

Grouting agents, such as air-entraining admixtures, accelerators, retarders, and non-shrink and workability agents, adjust grout properties to achieve a desired result for specific applications. For example, portland cement grouts are used for a variety of different purposes, each of which may require a different agent to stabilize foundations, set machine bases, fill cracks and joints in concrete work, cement oil wells, fill cores of masonry walls, and grout pre-stressing tendons and anchor bolts, and fill the voids in pre-placed aggregate concrete.

Gas formers, or gas-forming agents, are sometimes added to concrete and grout in very small quantities to cause a slight expansion prior to hardening. The amount of expansion is dependent upon the amount of gas-forming material used and the temperature of the fresh mixture. Aluminum powder, resin soap and vegetable or animal glue, saponin or hydrolyzed protein can be used as gas formers.

Permeability reducers are used to reduce the rate at which water under pressure is transmitted through concrete. Silica fume, fly ash, ground slag, natural pozzolans, water reducers, and latex can be employed to decrease the permeability of the concrete. Pozzolan is a siliceous or siliceous and aluminous material, which in itself possesses little or no cementitious value. However, in finely divided form and in the presence of moisture, pozzolan will chemically react with calcium hydroxide at ordinary temperatures to form compounds possessing cementitious properties.

Pumping aids are added to concrete mixes to improve pumpability. These admixtures thicken the fluid concrete, i.e., increase its viscosity, to reduce de-watering of the paste while it is under pressure from the pump. Among the materials used as pumping aids in concrete are organic and synthetic polymers, hydroxyethylcellulose (HEC) or HEC blended with dispersants, organic flocculents, organic emulsions of paraffin, coal tar, asphalt, acrylics, bentonite and pyrogenic silicas, natural pozzolans, fly ash and hydrated lime.

Bacteria and fungal growth on or in hardened concrete may be partially controlled through the use of fungicidal, germicidal, and insecticidal admixtures. The most effective materials for these purposes are polyhalogenated phenols, dialdrin emulsions, and copper compounds.

Fresh concrete can sometimes be harsh because of faulty mixture proportions or certain aggregate characteristics such as particle shape and improper grading. Under these conditions, entrained air which acts like a lubricant, can be used as a workability improving agent. Other workability agents are water reducers and certain finely divided admixtures.

Finely divided mineral admixtures are materials in powder or pulverized form added to concrete before or during the mixing process to improve or change some of the plastic or hardened properties of portland cement concrete. Portland cement, as used in the trade, means a hydraulic cement produced by pulverizing clinker, consisting essentially of hydraulic calcium silicates, all usually containing one or more of the forms of calcium sulfate as an interground addition with ASTM types, I, II, III, IV, or V. The finely divided mineral admixtures can be classified according to their chemical or physical properties as: cementitious materials; pozzolans; pozzolanic and cementitious materials; and nominally inert materials. Cementitious materials are materials that alone have hydraulic cementing properties, and set and harden in the presence of water. Included in cementitious materials are ground granulated blast-furnace slag, natural cement, hydraulic hydrated lime, and combinations of these and other materials. As discussed above, pozzolan is a siliceous or aluminosiliceous material that possesses little or no cementitious value but will, in the presence of water and in finely divided form, chemically react with the calcium hydroxide released by the hydration of portland cement to form materials with cementitious properties. Diatomaceous earth, opaline cherts, clays, shales, fly ash, silica fume, volcanic tuffs and pumicites are some of the known pozzolans. Certain ground granulated blast-furnace slags and high calcium fly ashes possess both pozzolanic and cementitious properties. Natural pozzolan is a term of art used to define the pozzolans that occur in nature, such as volcanic tuffs, pumices, trasses, diatomaceous earths, opaline, cherts, and some shales. Nominally inert materials can also include finely divided raw quartz, dolomites, limestones, marble, granite, and others. Fly ash is defined in ASTM C-618.

In the construction field, many methods of strengthening concrete have been developed through the years. One modern method involves distributing fibers throughout a fresh concrete mixture. Upon hardening, this concrete is referred to as fiber-reinforced concrete. Fibers can be made of zirconium materials, steel, fiberglass, or synthetic materials, e.g., polypropylene, nylon, polyethylene, polyester, rayon, high-strength aramid, (i.e. KEVLAR®), or mixtures thereof.

A cementitious composition having controlled air content can be formed which comprises cement, water, a water insoluble defoamer, a dispersant for cementitious compositions, and a solubilizing agent that solubilizes the water insoluble defoamer. The cementitious composition can also include fine aggregates, coarse aggregates, pozzolans, air (either entrapped or purposefully entrained), clay, and pigments.

The fine aggregates are materials that pass through a Number 4 sieve (ASTM C125 and ASTM C33), such as natural or manufactured sand. The coarse aggregates are materials that are retained on a Number 4 sieve (ASTM C125 and ASTM C33), such as silica, quartz, crushed round marble, glass spheres, granite, limestone, calcite, feldspar, alluvial sands, or any other durable aggregate, and mixtures thereof.

A method of controlling air in a cementitious composition is also provided according to the present invention which comprises mixing cement, water, a water insoluble defoamer, a dispersant for cementitious compositions, and a solubilizing agent that solubilizes the water insoluble defoamer. Other admixtures and additives are added to the cement mixture at appropriate times prior or subsequent to the addition of the inventive admixture.

The amount of water added to the cementitious composition is calculated based on a desired water to cement (W/C) ratio. The water to cement ratio typically ranges from about 0.2 to about 0.7 with the water and cement being measured by weight.

SPECIFIC EMBODIMENTS OF THE INVENTION

Samples of microemulsion solutions and cementitious compositions were prepared using different insoluble defoamers, solubilizing agents, and a dispersant for cementitious compositions. The cementitious compositions additionally contained cement and aggregate. The dispersant for cementitious compositions used in the following examples was a polycarboxylate dispersant, which was a polymer with polymeric carboxylate backbone with polyether side chains.

The following tests were used: Slump (ASTM C143), and Air content (ASTM C231). Aggregates met the specifications of ASTM C33. The term W/C refers to the water to cement ratio in a cementitious mixture. The term S/A refers to the sand to aggregate ratio by volume.

In the following examples, insoluble defoamer A is a proprietary acetylenic glycol based defoamer sold as DYNOL™ 604 from Air Products and Chemicals. Insoluble defoamer B is a 40% ethylene oxide adduct to 2,4,7,9-tetramethyl-5-decyn-4,7-diol, which is sold as SURFYNOL® 440 from Air Products and Chemicals. Solubilizing agent C is an 85% ethylene oxide adduct to 2,4,7,9-tetramethyl-5 decyn-4,7-diol, which is sold as SURFYNOL® 485 from Air Products and Chemicals. Solubilizing agent D is a 65% ethylene oxide adduct to 2,4,7,9-tetramethyl-5 decyn-4,7-diol, which is sold as SURFYNOL® 465 from Air Products and Chemicals.

Solution Examples S-1 to S-5

Compositions comprising water, a polycarboxylate dispersant, insoluble defoamer A, and solubilizing agents C and D are shown below in Table 1. The amounts of the material are shown as percent by weight of the solution. The solutions were prepared initially by combining water, dispersant, and insoluble defoamer and then stirring with a magnetic stir bar in a glass beaker. Because of the hydrophobicity of the insoluble defoamer, the resulting solutions were turbid and opaque. The solubilizing agents were then added slowly, with stirring, until the resulting solution was clear. Solutions S-3 and S-5 show a combination of solubilizing agents that differ in ethylene oxide content.

Solution Examples S-6 to S-9

Compositions comprising water, a polycarboxylate dispersant, insoluble defoamer B, and solubilizing agents C and D are shown below in Table 1. The amounts of the material are shown as percent by weight of the solution. The solutions were prepared the same as previously described.

TABLE 1

| Solution | Defoamer (%) A | B | Solubilizing Agent (%) C | D | Cement Dispersant (%) | Water (%) | Stability @ 25° C. |
|---|---|---|---|---|---|---|---|
| S-1 | 0.200 | | 1.360 | | 20 | 78.440 | Clear |
| S-2 | 0.200 | | | 3.320 | 20 | 76.480 | Clear |
| S-3 | 0.200 | | 1.000 | 0.424 | 20 | 78.376 | Clear |
| S-4 | 0.400 | | 1.600 | | 20 | 78.000 | Clear |
| S-5 | 0.400 | | 0.866 | 0.984 | 20 | 77.750 | Clear |
| S-6 | | 0.215 | | 2.866 | 21.5 | 75.419 | Clear |
| S-7 | | 0.215 | 0.516 | | 21.5 | 77.769 | Clear |
| S-8 | | 0.645 | 1.511 | | 21.5 | 76.344 | Clear |
| S-9 | | 0.860 | 2.098 | | 21.5 | 75.542 | Clear |

Solution Examples S-10 to S-19

Compositions comprising various levels of insoluble defoamer A, solubilizing agent C, and polycarboxylate dispersant were prepared as above. The results are listed in Table 2, and the amounts of the material are shown as percent weight of the solution. The resulting solutions were then stored at 43° C. for a minimum of five weeks where they remained as clear, stable solutions.

TABLE 2

| Solution | Defoamer (%) A | Solubilizing Agent (%) C | Cement Dispersant (%) | Water (%) | Stability @ 25° C. | Stability @ 43° C. |
|---|---|---|---|---|---|---|
| S-10 | 0.480 | 2.160 | 24 | 73.360 | Clear | Clear |
| S-11 | 0.560 | 2.800 | 28 | 68.640 | Clear | Clear |
| S-12 | 0.600 | 3.000 | 30 | 66.400 | Clear | Clear |
| S-13 | 0.840 | 3.696 | 28 | 67.464 | Clear | Clear |
| S-14 | 0.960 | 7.200 | 24 | 67.840 | Clear | Clear |
| S-15 | 1.120 | 5.320 | 28 | 65.560 | Clear | Clear |
| S-16 | 1.280 | 5.760 | 32 | 60.960 | Clear | Clear |
| S-17 | 1.400 | 5.600 | 28 | 65.000 | Clear | Clear |
| S-18 | 1.200 | 3.600 | 20 | 75.200 | Clear | Clear |
| S-19 | 1.920 | 8.640 | 24 | 65.440 | Clear | Clear |

Concrete Performance Examples

Solutions S-1 to S-9, S-14, and S-17 were prepared in sufficient quantity to evaluate their performance in concrete. Additional samples of solutions S-15 and S-18, designated as S-15a and S-18a, were prepared using a 5.26% and 11.11% increase in the solubilizing agent C, respectively. The amounts of the materials shown in Tables 3 to 6 are based on percent by weight of cement.

The concrete mixture proportions for the examples shown in Tables 3 and 4 were based on a 600 lb./yd³ mixture using Type I portland cement, a sand to aggregate (S/A) ratio of 0.44–0.45 using limestone coarse aggregate and sand, and sufficient amount of water to obtain the desired slump of approximately 6 to 8 inches.

The concrete mixture proportions for the examples shown in Table 5 were based on a 600 lb./yd³ mixture using Type I portland cement, a sand to aggregate (S/A) ratio of 0.42 using limestone coarse aggregate and sand, and sufficient amount of water to obtain the desired slump of approximately 6 to 8 inches.

The concrete mixture proportions for the examples shown in Table 6 were based on a 658 or 517 lb./yd³ mixture using Type I portland cement, a sand to aggregate (S/A) ratio of 0.415–0.42 using limestone coarse aggregate and sand, and sufficient amount of water to obtain the desired slump of approximately 6 to 8 inches.

Table 3 summarizes the performance data for various polycarboxylate dispersant and insoluble defoamer microemulsion compositions in non-air-entrained concrete. A reference sample with the polycarboxylate cement dispersant only was prepared. Control samples with the polycarboxylate dispersant with insoluble defoamer without the solubilizing agent were prepared at levels that correspond to those contained in the solution examples. The solutions were dosed in order to provide a level of cement dispersant equivalent to 0.14 to 0.20 percent by cement weight. Admixture examples 1, 2, and 3 were formulated to bracket the level of solubilizing agent C provided by solution S-1. Admixture examples 4, 5, and 6 were formulated to bracket the level of solubilizing agent D provided by solution S-2. All of the values shown are expressed as percent active material by cement weight in the concrete mixture. Slump and air content determinations were made after 5 minutes of mixing.

TABLE 3

| Admixture | Cement Dispersant (%) | Defoamer (%) A | B | Solubilizing Agent (%) C | D | Slump (inches) | Air (%) |
|---|---|---|---|---|---|---|---|
| Reference | 0.14 | | | | | 7.5 | 4.3 |
| Control 1 | 0.14 | 0.0014 | | | | 7.5 | 2.1 |
| 1 | 0.14 | 0.0014 | | 0.01260 | | 7.25 | 2.8 |
| S-1 | 0.14 | 0.0014 | | 0.00952 | | 7.5 | 2.9 |
| 2 | 0.14 | 0.0014 | | 0.00840 | | 7.25 | 2.6 |
| 3 | 0.14 | 0.0014 | | 0.00420 | | 7.5 | 2.4 |
| 4 | 0.14 | 0.0014 | | | 0.02800 | 7.75 | 2.7 |
| S-2 | 0.14 | 0.0014 | | | 0.02324 | 7.5 | 2.7 |
| 5 | 0.14 | 0.0014 | | | 0.02100 | 6.5 | 2.7 |
| 6 | 0.14 | 0.0014 | | | 0.01400 | 7.5 | 2.7 |
| S-3 | 0.14 | 0.0014 | | 0.00700 | 0.00297 | 7.75 | 2.7 |
| Control 2 | 0.14 | 0.0028 | | | | 6 | 2.0 |
| S-4 | 0.14 | 0.0028 | | 0.01120 | | 7 | 2.3 |
| S-5 | 0.14 | 0.0028 | | 0.00606 | 0.00689 | 6 | 2.3 |
| Control 3 | 0.14 | | 0.0014 | | | 8.5 | 2.3 |
| Control 4 | 0.14 | | 0.0056 | | | 8 | 2.7 |
| S-6 | 0.14 | 0.0014 | | | 0.01866 | 8 | 3.8 |
| S-7 | 0.14 | 0.0014 | 0.00336 | | | 4.5 | 2.6 |
| S-8 | 0.14 | 0.0042 | 0.00984 | | | 8.25 | 3.0 |
| S-9 | 0.14 | 0.0056 | 0.01366 | | | 8 | 2.9 |
| S-6 | 0.20 | 0.0020 | | | 0.02666 | 7.75 | 4.7 |
| S-7 | 0.20 | 0.0020 | 0.00480 | | | 7.5 | 3.1 |
| S-9 | 0.20 | 0.0080 | 0.01952 | | | 7.5 | 3.4 |

Except for solution S-6, which contained a low level of insoluble defoamer B and a high level of solubilizing agent D, all of the solutions and additional admixture examples demonstrated defoaming properties. Air contents were found to be lower than the dispersant only reference and similar to the dispersant+defoamer controls. In solutions S-1 and S-2, where the solubilizer amount was bracketed by admixtures 1, 2, 3 and 4, 5, 6, respectively, air contents were the same. This indicated that the defoaming potential is governed primarily by the insoluble defoamer level and that the level of solubilizing agent did not significantly affect the air response.

Tables 4, 5 and 6 summarize performance data for a polycarboxylate dispersant, insoluble defoamer, and solubilizing agent microemulsion compositions in air entrained concrete. The air entraining agent, a commercially available, proprietary product, tradename MICRO-AIR®, manufactured by Master Builders Inc., was used at the dosages listed in the tables. Concrete mixture proportions were similar to those in the previous examples with the batch volume increase from the entrained air adjusted for by removing sand and coarse aggregate and maintaining the S/A ratio.

Table 6 summarizes the results in air entrained concrete for solution S-18a used at three different levels of cement

TABLE 4

| Admixture | Cement Dispersant (%) | Defoamer A (%) | Solubilizing Agent C (%) | AEA (%) | Slump/Air (inches)/(%) | | |
|---|---|---|---|---|---|---|---|
| | | | | | 5 min. | 10 min. | 15 min. |
| Control 1 | 0.14 | 0.0014 | | 0.00415 | 8/7.1 | 4/4.8 | 2.5/3.5 |
| S-1 | 0.14 | 0.0014 | 0.00952 | 0.00415 | 8.5/11.2 | 6.5/8.5 | 3.5/5.5 |
| Control 2 | 0.14 | 0.0028 | | 0.00415 | 8/5.3 | 5.5/4.0 | 3.5/3.1 |
| S-4 | 0.14 | 0.0028 | 0.01120 | 0.00415 | 8.5/8.1 | 5.5/5.3 | 3/3.8 |

In Table 4, all mixture proportions and dosages were fixed in order to compare the air response over time of solutions S-1 and S-4 to controls containing only insoluble defoamer. The results show that the air response pattern over time was similar for both microemulsion solutions and their respective controls. While the initial air content for solution S-1 was somewhat high, increasing the amount of insoluble defoamer, as in S-4, resulted in lower initial air.

TABLE 5

| Solution | Cement Dispersant (%) | Defoamer A (%) | Solubilizing Agent C (%) | AEA (%) | Slump (inches) | Air (%) |
|---|---|---|---|---|---|---|
| Control 4 | 0.14 | 0.0056 | | 0.00415 | 7.75 | 4.5 |
| Control 5 | 0.14 | 0.0070 | | 0.00415 | 7.5 | 4.0 |
| Control 6 | 0.14 | 0.0084 | | 0.00415 | 7.5 | 3.7 |
| S-15a | 0.14 | 0.0056 | 0.028 | 0.00415 | 7.5 | 5.9 |
| S-17 | 0.14 | 0.0070 | 0.028 | 0.00415 | 7 | 4.7 |
| S-18a | 0.14 | 0.0084 | 0.028 | 0.00415 | 8 | 5.1 |
| 7 | 0.14 | 0.0056 | 0.035 | 0.00415 | 7.75 | 5.8 |
| 8 | 0.14 | 0.0070 | 0.035 | 0.00415 | 7 | 4.6 |
| 9 | 0.14 | 0.0084 | 0.035 | 0.00415 | 7.75 | 5.0 |
| S-14 | 0.14 | 0.0056 | 0.042 | 0.00415 | 7.5 | 6.2 |
| 10 | 0.14 | 0.0070 | 0.042 | 0.00415 | 7.5 | 5.7 |
| 11 | 0.14 | 0.0084 | 0.042 | 0.00415 | 7.75 | 5.2 |

Table 5 compared three levels of defoamer, each with three levels of solubilizing agent C and a fixed dosage of air entraining agent. These results demonstrate that at a sufficient insoluble defoamer level, air contents are controlled to desirable levels and that the level of solubilizer does not significantly affect the air response.

dispersant in concrete mixtures having different cement contents. The dosage of air entraining agent was adjusted for the different amounts of solution to maintain an air content between 5–8%. The results show similar performance for the different cement content mixtures and that the air contents were controlled by increasing the level of air entraining agent to correspond with an increase of the solution level.

SMA® 2000 and SMA® 3000 in Combination with PLURONIC L-61 Evaluation

Several mixtures were prepared as detailed in Table 7 below to evaluate SMA 2000 and SMA 3000 in combination with PLURONIC® L-61. SMA® 2000 and SMA® 3000 are styrene maleic-anhydride copolymers available from Elf-Atochem. The PLURONIC® L-61, MICRO-AIR®, and AE®90 are as described above. The polycarboxylate dispersant used was a blend of dispersants of the types defined in m) and f) above.

The SMA resin solution was combined with PLURONIC® L 61 and stirred. Added the required water followed by the polycarboxylate concentrate solution under stirring. Formulations contained PLURONIC® L61 at 5% by weight of polycarboxylate and hydrolyzed SMA® 3000 or SMA® 2000 in 2:1 weight ratio with PLURONIC® L 61. The polycarboxylate concentration was 15% with SMA® 3000 and 20% with SMA® 2000. Admixtures were clear immediately upon preparation or became clear after standing. The SMA® 3000/L61 formulation remained clear at storage temperatures as low as 36° F. and as high as 110° F. The admixtures were added to mortar composition as described in Table 7.

TABLE 6

| Admixture | Cement Content | Cement Dispersant (%) | Defoamer A (%) | Solubilizing Agent C (%) | AEA (%) | Slump/Air (inches)/(%) | | |
|---|---|---|---|---|---|---|---|---|
| | | | | | | 5 min. | 10 min. | 15 min. |
| Reference | 658 | | | | 0.00746 | 7/6.6 | | |
| S-18a | 658 | 0.08 | 0.0048 | 0.016 | 0.00249 | 8.25/7.6 | 7.25/8.5 | 6/8.5 |
| S-18a | 658 | 0.14 | 0.0084 | 0.028 | 0.00415 | 7.5/5.4 | 5/5.0 | 3/4.6 |
| S-18a | 658 | 0.20 | 0.0120 | 0.040 | 0.00746 | 10.25/5.2 | 9.25/5.0 | 6.25/4.3 |
| S-18a | 517 | 0.20 | 0.0120 | 0.040 | 0.00705 | 6.5/5.1 | 4.5/5.1 | 2.25/5.0 |
| S-18a | 517 | 0.14 | 0.0084 | 0.028 | 0.00415 | 7.25/6.0 | 6.5/6.4 | 3.75/6.3 |
| S-18a | 517 | 0.08 | 0.0048 | 0.016 | 0.00249 | 7.5/6.8 | 7/6.6 | 4.5/5.8 |

TABLE 7

| | SMA 3000/L61 | SMA 3000/L61 | L61 | SMA 3000/L61 | SMA2000/L61 | SMA 2000/L61 |
|---|---|---|---|---|---|---|
| Cement (lbs/yd$^3$) | 598 | 596 | 596 | 580 | 611 | 609 |
| Water (lbs/yd$^3$) | 278 | 247 | 247 | 236 | 257 | 250 |
| Sand (lbs/yd$^3$) | 1278 | 1202 | 1202 | 1170 | 1290 | 1228 |
| Stone (lbs/yd$^3$) | 1887 | 1780 | 1780 | 1732 | 1912 | 1817 |
| Water/Cement | 0.46 | 0.41 | 0.41 | 0.41 | 0.42 | 0.41 |
| Sand/Aggregate | 0.42 | 0.42 | 0.42 | 0.42 | 0.42 | 0.42 |
| Dispersant Dose (% cmt) | 0.14% | 0.14% | 0.14% | 0.14% | 0.14% | 0.14% |
| AEA/Dose (oz/cwt) | — | MICRO-AIR/ 0.3 | MICRO-AIR/ 0.3 | AE90/ 0.6 | — | MICRO AIR/ 0.2 |
| Slump (in) | | | | | | |
| 5 minutes | 8.25 | 8.00 | 8.50 | 8.75 | 8.00 | 8.50 |
| 10 minutes | 7.00 | 7.75 | 8.00 | 8.00 | 6.75 | 7.25 |
| 15 minutes | 3.25 | 6.75 | 6.75 | 7.00 | 4.75 | 5.75 |
| % Air | | | | | | |
| 5 minutes | 2.8 | 8.8 | 8.8 | 11.5 | 3.1 | 7.0 |
| 10 minutes | 2.8 | 9.0 | 9.2 | 12.0 | 2.8 | 6.9 |
| 15 minutes | 2.8 | 7.3 | 8.0 | 11.3 | 2.4 | 5.3 |

The results in Table 7 show concrete air content was reduced to 3% or less in non air entrained mixes with both cosurfactant-defoamer systems. Concrete air content was constant or decreased slightly during extended mixing. This behavior is typical of concrete containing conventional admixtures. The storage stable polycarboxylate/ SMA®3000/PLURONIC® L61 formulation performed similarly to the polycarboxylate/PLURONIC® L61 formulation (formulation separates during storage). The hydrolyzed SMA® 3000 stabilizer did not adversely affect admixture performance with this air entraining agent.

Air content testing in mortar using alkyl-ether sulfonates (sold under the tradename AVANEL®) as the solubilizing agent.

Admixtures were prepared (as detailed in Table 8 below) by combining polycarboxylate concentrate, water and defoamer with stirring. Under continued stirring, surfactant was added to clarify the mixture. PLURONIC® L61 or DYNOL™ 604 was formulated at 5% by weight of polycarboxylate dispersant. The dispersant level was fixed at 28% in each formulation. All formulations were clear except for admixture D, which was turbid. The polycarboxylate dispersant used was the type described in m) above.

Mortar was prepared using 300 g of Ashgrove Type I cement, 900 g of ASTM C-109 sand and sufficient water to obtain a 0.5 water to cement ratio. Admixtures were added to the mix water and the mix water amount was adjusted for water contained in the admixture. The ingredients were mixed in a Hobart mixer for 3 minutes at a speed setting of 1. The mixing bowl was scraped down half way through the mix cycle. The results of air content testing are detailed in Table 8 below.

TABLE 8

| Admixture | Surfactant & Defoamer | Surfactant-Defoamer Active Weight Ratio | Dispersant Dose (% cmt) | Mortar Air Content (%) |
|---|---|---|---|---|
| — | — | — | — | 8.1 |
| Polycarboxylate without defoamer | — | — | 0.13 | 19.3 |
| A | AVANEL S-70/ PLURONIC L-61 | 0.5:1 | 0.13 | 24.5 |
| B | AVANEL S-74/ PLURONIC L-61 | 1.6:1 | 0.13 | 9.9 |
| C | AVANEL S-150CG/ PLURONIC L-61 | 0.7:1 | 0.13 | 22.5 |
| D | AVANEL S-70/ DYNOL 604 | 1.25:1 | 0.13 | 24.1 |
| E | AVANEL S-74/ DYNOL 604/ | 4:1 | 0.13 | 7.3 |
| F | AVANEL S-150 CG/ DYNOL 604/ | 3.8:1 | 0.13 | 24.1 |
| G | AVANEL S-74/ PLURONIC L-61 | 2:1 | 0.13 | 9.3 |

The results in Table 8 show that the AVANEL® S-74 and PLURONIC® L-61 or DYNOL™ 604 system controlled the air entraining characteristics of the polycarboxylate dispersant. Mortar air contents using these two formulations were similar to the air content for a plain mortar. Performance for AVANEL® S-70 and AVANEL® S-150 CG were not as good as for AVANEL® S-74.

Therefore, the present invention provides an admixture containing a water insoluble defoamer, a dispersant for cementitious compositions, and a solubilizing agent capable of solubilizing the water insoluble defoamer for controlling the amount of air in a predictable manner in cementitious compositions.

The present invention also provides a cementitious composition comprising cement, water, a water insoluble defoamer, a dispersant for cementitious compositions, and a solubilizing agent capable of solubilizing the water insoluble defoamer for controlling the amount of air in a predictable manner in the cementitious composition.

The present invention also provides a method of making a cementitious composition comprising mixing cement, water, a water insoluble defoamer, a dispersant for cementitious compositions, and a solubilizing agent capable of solubilizing the water insoluble defoamer for controlling the amount of air in a predictable manner in the cementitious composition.

It should be appreciated that the present invention is not limited to the specific embodiments described above, but includes variations, modifications and equivalent embodiments defined by the following claims.

What is claimed is:

1. A cementitious composition comprising cement, water, a water insoluble defoamer, a dispersant for cementitious compositions, and a solubilizing agent, capable of solubilizing the water insoluble defoamer into particles of about 0.01 microns to about 0.05 microns, the solubility agent is at least one of alkoxylated R, carboxylated alkoxylated R, sulfated alkoxylated R, sulfonated alkoxylated R, styrene-maleic copolymer, or styrene-maleic copolymer derivatized with at least one of sulfonate, hydroxyl, alkoxyl, alkyl ester, or dimethyl amino propyl, wherein R is selected from the group consisting of a hydrocarbon, sorbitan, polypropylene oxide, fatty acid, fatty alcohol, isononanol, styrene maleic copolymer, derivatized styrene-maleic copolymer, and mixtures thereof, wherein the dispersant is at least one of:

a) a dispersant of Formula (I):

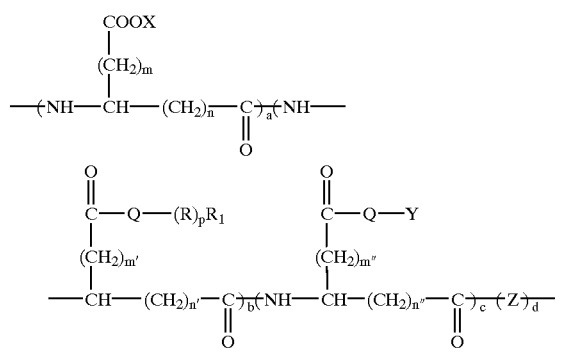

wherein in Formula (I)
X is at least one of hydrogen, an alkali earth metal ion, an alkaline earth metal ion, ammonium ion, or amine;
R is at least one of $C_1$ to $C_6$ alkyl(ene) ether or mixtures thereof or $C_1$ to $C_6$ alkyl(ene) imine or mixtures thereof;
Q is at least one of oxygen, NH, or sulfur;
p is a number from 1 to about 300 resulting in at least one of a linear side chain or branched side chain;
$R_1$ is at least one of hydrogen, $C_1$ to $C_{20}$ hydrocarbon, or functionalized hydrocarbon containing at least one of —OH, —COOH, an ester or amide derivative of —COOH, sulfonic acid, an ester or amide derivative of sulfonic acid, amine, or epoxy;
Y is at least one of hydrogen, an alkali earth metal ion, an alkaline earth metal ion, ammonium ion, amine, a hydrophobic hydrocarbon or polyalkylene oxide moiety that functions as a defoamer;
m, m', m'', n, n', and n'' are each independently 0 or an integer between 1 and about 20;
Z is a moiety containing at least one of i) at least one amine and one acid group, ii) two functional groups capable of incorporating into the backbone selected from the group consisting of dianhydrides, dialdehydes, and di-acid-chlorides, or iii) an imide residue; and
wherein a, b, c, and d reflect the mole fraction of each unit wherein the sum of a, b, c, and d equal one, wherein a, b, c, and d are each a value greater than or equal to zero and less than one, and at least two of a, b, c, and d are greater than zero;

b) a dispersant of Formula (II):

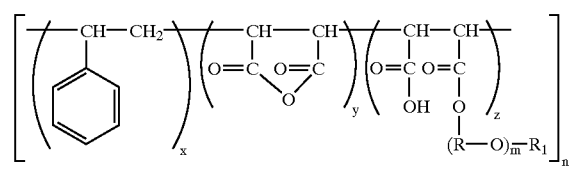

wherein in Formula (II):
R is a $C_{2-6}$ alkylene radical;
R1 is a $C_{1-20}$ alkyl, $C_{6-9}$ cycloalkyl or phenyl group;
x, y, and z are a number from 0.01 to 100;
m is a number from 1 to 100; and
n is a number from 10 to 100;

c) a dispersant of Formula (III):

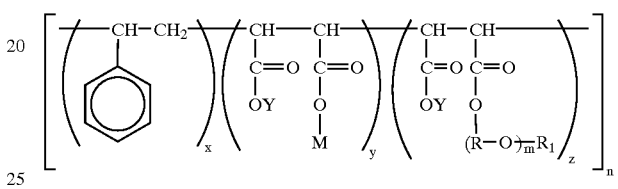

wherein in Formula (III):
M is hydrogen or the residue of a hydrophobic polyalkylene glycol or polysiloxane;
Y is hydrogen, an alkali or alkaline earth metal ion, ferrous ion, aluminum ion, (alkanol)ammonium ion, or (alkyl)ammonium ion;
R is a $C_{2-6}$ alkylene radical;
$R_1$ is a $C_{1-20}$ alkyl, $C_{6-9}$ cycloalkyl, or phenyl group;
x, y, and z are numbers from 1 to 100;

d) a dispersant comprising at least one polymer or a salt thereof having the form of a copolymer of
i) a maleic anhydride half-ester with a compound of the formula RO(AO)$_m$H, wherein R is a $C_1$–$C_{20}$ alkyl group, A is a $C_{2-4}$ alkylene group, and m is an integer from 2–16; and
ii) a monomer having the formula CH$_2$=CHCH$_2$—(OA)$_n$OR, wherein n is an integer from 1–90 and R is a $C_{1-20}$ alkyl group;

e) a reaction product formed by reacting a polycarboxylic acid with a nitrogeneous acrylic polymer;

f) a dispersant obtained by copolymerizing 5 to 98% by weight of an (alkoxy)polyalkylene glycol mono(meth) acrylic ester monomer (a) represented by the following general formula (1):

wherein $R_1$ stands for hydrogen atom or a methyl group, $R_2O$ for one species or a mixture of two or more species of oxyalkylene group of 2 to 4 carbon atoms, providing two or more species of the mixture may be added either in the form of a block or in a random form, $R_3$ for a hydrogen atom or an alkyl group of 1 to 5 carbon atoms, and m is a value indicating the average addition mol number of oxyalkylene groups that is an integer in the range of 1 to 100, 95 to 2% by weight of a (meth)acrylic acid monomer (b) represented by the above general formula (2), wherein $R_4$ and $R_5$ are each independently a hydrogen atom or a methyl group, and $M_1$ for a hydrogen atom, a monovalent metal atom, a divalent metal atom, an ammonium group, or an organic amine group, and 0 to 50% by weight of other monomer (c) copolymerizable with these monomers, provided that the total amount of (a), (b), and (c) is 100% by weight;

g) a graft polymer that is a polycarboxylic acid or a salt thereof, having side chains derived from at least one species selected from the group consisting of oligoalkyleneglycols, polyalcohols, and polyalkylene glycols;

h) a styrene-maleic anhydride copolymer in free acid or salt form, wherein the copolymer consists of the following monomer units and numbers of monomer units:

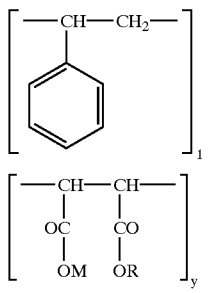
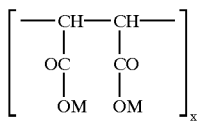
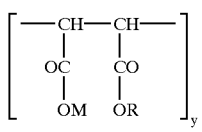

wherein:
M is selected from hydrogen, a cation or a residue of a hydrophobic polyalkylene glycol or polysiloxane;
R is the residue of a methylpoly(ethylene) glycol of weight average molecular weight 900–2000;
x=0.35–0.75; and
y=0.25–0.65;

i) a reaction product of component A, optionally component B, and component C; wherein each component A is independently a nonpolymeric, functional moiety that adsorbs onto a cementitious particle, and contains at least one residue derived from a first component selected from the group consisting of phosphates, phosphonates, phosphinates, hypophosphites, sulfates, sulfonates, sulfinates, alkyl trialkoxy silanes, alkyl triacyloxy silanes, alkyl triaryloxy silanes, borates, boronates, boroxines, phosphoramides, amines, amides, quaternary ammonium groups, carboxylic acids, carboxylic acid esters, alcohols, carbohydrates, phosphate esters of sugars, borate esters of sugars, sulfate esters of sugars, salts of any of the preceding moieties, and mixtures thereof; wherein component B is an optional moiety, where if present, each component B is independently a nonpolymeric moiety that is disposed between the component A moiety and the component C moiety, and is derived from a second component selected from the group consisting of linear saturated hydrocarbons, linear unsaturated hydrocarbons, saturated branched hydrocarbons, unsaturated branched hydrocarbons, alicyclic hydrocarbons, heterocyclic hydrocarbons, aryl, phosphoester, nitrogen containing compounds, and mixtures thereof; and wherein component C is at least one moiety that is a linear or branched water soluble, nonionic polymer substantially non-adsorbing to cement particles, and is selected from the group consisting of poly(oxyalkylene glycol), poly(oxyalkylene amine), poly(oxyalkylene diamine), monoalkoxy poly(oxyalkylene amine), monoaryloxy poly(oxyalkylene amine), monoalkoxy poly(oxyalkylene glycol), monoaryloxy poly (oxyalkylene glycol), poly(vinyl pyrrolidones), poly (methyl vinyl ethers), poly(ethylene imines), poly (acrylamides), polyoxazoles, and mixtures thereof;

j) a dispersant of Formula (IV):

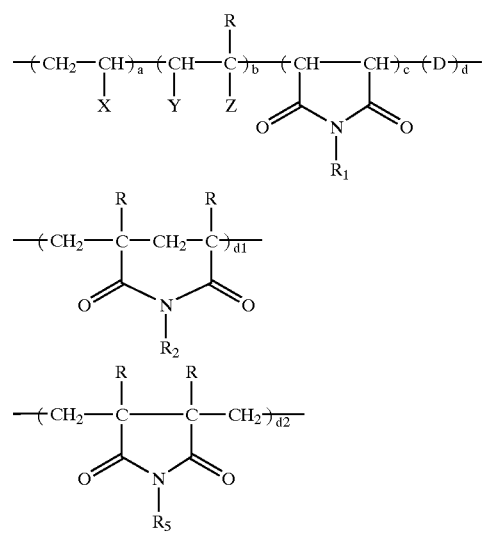

wherein in Formula (IV):
D=a component selected from the group consisting of the structure d1, the structure d2, and mixtures thereof;
X=H, $CH_3$, $C_2$ to $C_6$ Alkyl, Phenyl, p-Methyl Phenyl, Sulfonated Phenyl;
Y=H, —COOM;
R=H, $CH_3$;
Z=H, —$SO_3M$, —$PO_3M$, —COOM, —$OR_3$, —$COOR_3$, —$CH_2OR_3$, —$CONHR_3$, —CONHC $(CH_3)_2CH_2SO_3M$, —$COO(CHR_4)_nOH$ where n=2 to 6;
$R_1$, $R_2$, $R_3$, $R_5$ are each independently —$(CHRCH_2O)_m$ $R_4$ random copolymer of oxyethylene units and oxypropylene units where m=10 to 500 and wherein the amount of oxyethylene in the random copolymer is from about 60% to 100% and the amount of oxypropylene in the random copolymer is from 0% to about 40%;
$R_4$=H, Methyl, $C_2$ to about $C_6$ Alkyl, about $C_6$ to about $C_{10}$ aryl;
M=H, Alkali Metal, Alkaline Earth Metal, Ammonium, Amine, triethanol amine, Methyl, $C_2$ to about $C_6$ Alkyl;
a=0 to about 0.8;
b=about 0.2 to about 1.0;
c=0 to about 0.5;
d=0 to about 0.5; and wherein a, b, c, and d represent the mole fraction of each unit and the sum of a, b, c, and d is 1.0;

k) a dispersant of Formula (V):

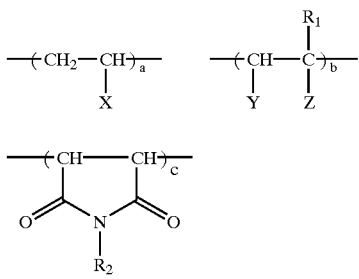

wherein in Formula (V):

the "b" structure is one of a carboxylic acid monomer, an ethylenically unsaturated monomer, or maleic anhydride wherein an acid anhydride group (—CO—O—CO—) is formed in place of the groups Y and Z between the carbon atoms to which the groups Y and Z are bonded respectively, and the "b" structure must include at least one moiety with a pendant ester linkage and at least one moiety with a pendant amide linkage;

X=H, $CH_3$, $C_2$ to $C_6$ Alkyl, Phenyl, p-Methyl Phenyl, p-Ethyl Phenyl, Carboxylated Phenyl, Sulfonated Phenyl;

Y=H, —COOM, —COOH, or W;

W=a hydrophobic defoamer represented by the formula $R_5O—(CH_2CH_2O)_s—(CH_2C(CH_3)HO)_t—(CH_2CH_2O)_u$ where s, t, and u are integers from 0 to 200 with the proviso that t>(s+u) and wherein the total amount of hydrophobic defoamer is present in an amount less than about 10% by weight of the polycarboxylate dispersant;

Z=H, —COOM, —$OR_3$, —$COOR_3$, —$CH_2OR_3$, or —$CONHR_3$;

$R_1$=H, or $CH_3$;

$R_2$, $R_3$, are each independently a random copolymer of oxyethylene units and oxypropylene units of the general formula —$(CH(R_1)CH_2O)_mR_4$ where m=10 to 500 and wherein the amount of oxyethylene in the random copolymer is from about 60% to 100% and the amount of oxypropylene in the random copolymer is from 0% to about 40%;

$R_4$=H, Methyl, or $C_2$ to $C_8$ Alkyl;

$R_5$=$C_1$ to $C_{18}$ alkyl or $C_6$ to $C_{18}$ alkyl aryl;

M=Alkali Metal, Alkaline Earth Metal, Ammonia, Amine, monoethanol amine, diethanol amine, triethanol amine, morpholine, imidazole;

a=0.01–0.8;

b=0.2–0.99;

c=0–0.5; and wherein a, b, c represent the mole fraction of each unit and the sum of a, b, and c, is 1;

l) a random copolymer corresponding to the following Formula (VI) in free acid or salt form having the following monomer units and numbers of monomer units:

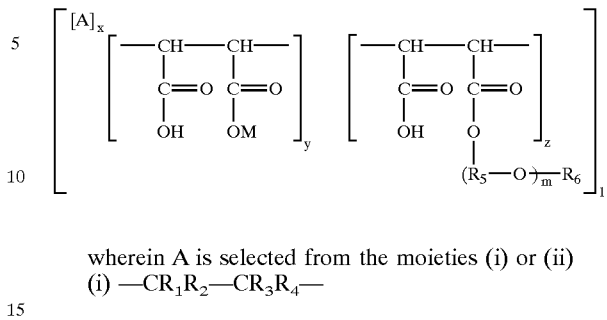

wherein A is selected from the moieties (i) or (ii)

(i) —$CR_1R_2$—$CR_3R_4$— ii)

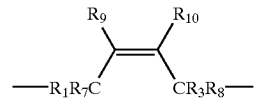

wherein $R_1$ and $R_3$ are selected from $C_{1-8}$ alkyl, $C_{2-8}$ alkenyl, $C_{2-8}$ alkylcarbonyl, $C_{1-8}$ alkoxy, carboxyl, hydrogen, or a ring wherein $R_1$ and $R_3$ can together with $R_2$ and/or $R_4$ form the ring; and $R_2$ and $R_4$ are selected from the group consisting of hydrogen and $C_{1-4}$ alkyl;

$R_7$, $R_8$, $R_9$, and $R_{10}$ are individually selected from the group consisting of hydrogen, $C_{1-6}$ alkyl, and a continuous $C_{2-8}$ hydrocarbon chain, wherein $R_1$ and $R_3$ together with $R_7$ and/or $R_8$, $R_9$, and $R_{10}$ form the continuous $C_{2-8}$ hydrocarbon chain joining the carbon atoms to which they are attached, the hydrocarbon chain optionally having at least one anionic group, wherein the at least one anionic group is optionally sulfonic;

M is selected from the group consisting of hydrogen, and the residue of a hydrophobic polyalkylene glycol or a polysiloxane, with the proviso that when A is (ii) and M is the residue of a hydrophobic polyalkylene glycol, M must be different from the group —$(R_5O)_mR_6$;

$R_5$ is a $C_{2-8}$ alkylene radical;

$R_6$ is selected from the group consisting of $C_{1-20}$ alkyl, $C_{6-9}$ cycloalkyl and phenyl;

n, x, and z are numbers from 1 to 100;

y is 0 to 100;

m is 2 to 1000;

the ratio of x to (y+z) is from 1:10 to 10:1 and the ratio of y:z is from 5:1 to 1:100;

m) a copolymer of oxyalkyleneglycol-alkenyl ethers and unsaturated dicarboxylic acids, comprising:

i) 10 to 90 mol % of at least one component of the formula Ia or Ib:

Ia

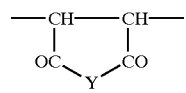

Ib wherein M is a hydrogen atom, a mono- or divalent metal cation, an ammonium ion or an organic amine residue, a is 1, or when M is a divalent metal cation a is ½;

wherein X is —OM$_a$, —O(C$_m$H$_{2m}$O)$_n$—R$_1$ in which R$_1$ is a hydrogen atom, an aliphatic hydrocarbon radical containing from 1 to 20 carbon atoms, a cycloaliphatic hydrocarbon radical containing 5 to 8 carbon atoms or an optionally hydroxyl, carboxyl, or sulphonic substituted aryl radical containing 6 to 14 carbon atoms, m is 2 to 4, and n is 0 to 100, —NHR$_2$, —N(R$_2$)$_2$ or mixtures thereof in which R$_2$=R$_1$ or —CO—NH$_2$; and wherein Y is an oxygen atom or —NR$_2$;

ii) 1 to 89 mol % of components of the general formula:

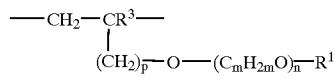

wherein R$_3$ is a hydrogen atom or an aliphatic hydrocarbon radical containing from 1 to 5 carbon atoms, p is 0 to 3, and R$_1$ is hydrogen, an aliphatic hydrocarbon radical containing from 1 to 20 carbon atoms, a cycloaliphatic hydrocarbon radical containing 5 to 8 carbon atoms or an optionally hydroxyl, carboxyl, or sulfonic substituted aryl radical containing 6 to 14 carbon atoms, m is 2 to 4, and n is 0 to 100, and iii) 0.1 to 10 mol % of components of the general formulae:

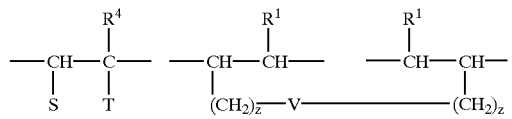

wherein S is a hydrogen atom or —COOM$_a$ or —COOR$_5$, T is —COOR$_5$, —W—R$_7$, —CO—[—NH—(CH2)3)—]$_s$—W—R$_7$, —CO—O—(CH$_2$)$_z$—W—R$_7$, a radical of the general formula:

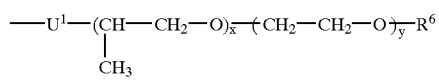

or —(CH$_2$)$_2$—V—(CH$_2$)$_2$—CH=CH—R$_1$, or when S is —COOR$_5$ or —COOM$_a$, U$_1$ is —CO—NHM—, —O— or —CH$_2$O, U$_2$ is —NH—CO—, —O— or —OCH$_2$, V is —O—CO—C$_6$H$_4$—CO—O— or —W—, and W is

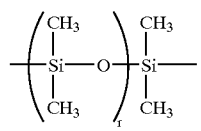

R4 is a hydrogen atom or a methyl radical, R5 is an aliphatic hydrocarbon radical containing 3 to 20 carbon atoms, a cycloaliphatic hydrocarbon radical containing 5 to 8 carbon atoms or an aryl radical containing 6 to 14 carbon atoms, R$_6$=R$_1$ or

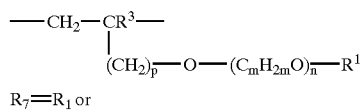

R$_7$=R$_1$ or

-continued

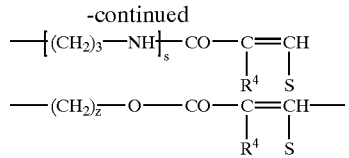

r is 2 to 100, s is 1 or 2, x is 1 to 150, y is o to 15 and z is 0 to 4.

2. The cementitious composition of claim 1, wherein the solubilizing agent is at least one of:
   a. block copolymers of ethylene oxide and propylene oxide;
   b. acetylenic diols;
   c. mono alkyl polyoxyalkylenes;
   d. ethoxylated nonylphenols
   e. an alkyl-ether sulfonate represented by R$_1$—(OCH$_2$CH$_2$)$_n$—SO$_3$M, wherein R$_1$ is an alkyl with 6 to 18 carbon atoms, and n is an integer from 1 to 15;
   f. an alkyl-ether carboxylate represented by R$_1$O(CHR$_2$CH$_2$O)$_n$CH$_2$CH$_2$COOM, wherein R$_1$ is a C$_4$-C$_{18}$ hydrocarbon, R$_2$=H or CH$_3$, n=1–30, m=H, Na, K, Li, Ca, Mg, amine, or ammonia; or
   g. a styrene-maleic copolymer given by the following formula:

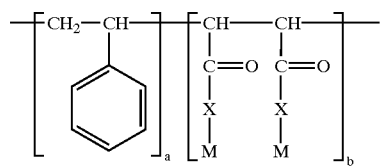

wherein M is independently at least one of H, Na, K, Ca, Mg, alkyl, hydroxyl alkyl, amino alkyl, alkylaryl, or an oxyalkylene group (R$_2$O)$_n$—R$_3$, wherein R$_2$ is a C$_2$-C$_4$ alkylene group, and R$_3$ is H or C$_1$-C$_{22}$ alkyl group, alkyl-aryl group, or aryl group, n=1–500, X is —O— or —NHR$_4$, with the proviso that an anhydride may be formed when X is —O—, and an imide ring may be formed when X is —NHR$_4$, and R$_4$ is H, alkyl, hydroxyl alkyl, amino alkyl, aryl, alkylaryl, or an oxyalkylene group (R$_2$O)$_n$—R$_3$.

3. The cementitious composition of claim 1, wherein the water insoluble defoamer is at least one of a mineral oil, a vegetable oil, a fatty acid, a fatty acid ester, a hydroxyl functional compound, an amide, a phosphoric ester, a metal soap, a silicone, a polymer containing propylene oxide moieties, a hydrocarbon, or an acetylenic diol.

4. The cementitious composition of claim 1, wherein the cement is selected from the group consisting of portland cement, masonry cement, alumina cement, refractory cement, magnesia cement, calcium sulfoaluminate cement, oil well cement, and mixtures thereof.

5. The cementitious composition of claim 1 further comprising a cement admixture or additive that is at least one of a set accelerator, a set retarder, an air entraining agent, an air detraining agent, a foaming agent, a corrosion inhibitor, another cement dispersing agent, a pigment, a pozzolan, clay, or aggregate.

6. The cementitious composition of claim 5, wherein the aggregate is at least one of silica, quartz, crushed round marble, glass spheres, granite, limestone, calcite, feldspar, alluvial sands, or sand.

7. The cementitious composition of claim 5, wherein the pozzolan is at least one of natural pozzolan, fly ash, silica fume, calcined clay, or blast furnace slag.

8. The cementitious composition of claim 1, wherein the solubilizing agent is present in an amount sufficient to form a stable microemulsion.

9. The cementitious composition of claim 1, wherein the solubilizing agent is present in an amount from about 0.25% to about 40% based on the weight of the dispersant for cementitious compositions.

10. The cementitious composition of claim 1, wherein the water insoluble defoamer is present in an amount from about 0.01% to about 25% based on the weight of the dispersant for cementitious compositions.

11. The cementitious composition of claim 1, wherein the water insoluble defoamer is present in an amount from about 0.25% to about 10% based on the weight of the dispersant for cementitious compositions.

12. The cementitious composition of claim 1, wherein the dispersant for cementitious compositions is present in an amount from about 0.01% to about 2% based on the weight of the cement.

13. The cementitious composition of claim 1, wherein the dispersant for cementitious compositions is present in an amount from about 0.05% to about 0.5% based on the weight of the cement.

14. A cementitious composition comprising cement, water, a water insoluble defoamer, a dispersant for cementitious compositions, and a solubilizing agent, capable of solubilizing the water insoluble defoamer into particles of about 0.01 microns to about 0.05 microns, the solubility agent is at least one of alkoxylated R, carboxylated alkoxylated R, sulfated alkoxylated R, sulfonated alkoxylated R, styrene-maleic copolymer, or styrene-maleic copolymer derivatized with at least one of sulfonate, hydroxyl, alkoxyl, alkyl ester, or dimethyl amino propyl, wherein R is selected from the group consisting of a hydrocarbon, sorbitan, polypropylene oxide, fatty acid, fatty alcohol, isononanol, styrene maleic copolymer, derivatized styrene-maleic copolymer, and mixtures thereof, wherein the dispersant is at least one of:

a) a dispersant of Formula (I):

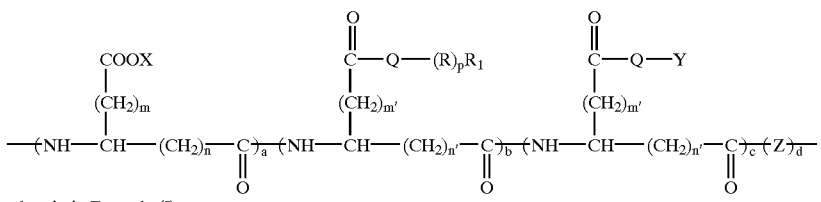

wherein in Formula (I)

X is at least one of hydrogen, an alkali earth metal ion, an alkaline earth metal ion, ammonium ion, or amine;

R is at least one of $C_1$ to $C_6$ alkyl(ene) ether or mixtures thereof or $C_1$ to $C_6$ alkyl(ene) imine or mixtures thereof;

Q is at least one of oxygen, NH, or sulfur;

p is a number from 1 to about 300 resulting in at least one of a linear side chain or branched side chain;

$R_1$ is at least one of hydrogen, $C_1$ to $C_{20}$ hydrocarbon, or functionalized hydrocarbon containing at least one of —OH, —COOH, an ester or amide derivative of —COOH, sulfonic acid, an ester or amide derivative of sulfonic acid, amine, or epoxy;

Y is at least one of hydrogen, an alkali earth metal ion, an alkaline earth metal ion, ammonium ion, amine, a hydrophobic hydrocarbon or polyalkylene oxide moiety that functions as a defoamer;

m, m', m", n, n', and n" are each independently 0 or an integer between 1 and about 20;

Z is a moiety containing at least one of i) at least one amine and one acid group, ii) two functional groups capable of incorporating into the backbone selected from the group consisting of dianhydrides, dialdehydes, and di-acid-chlorides, or iii) an imide residue; and wherein a, b, c, and d reflect the mole fraction of each unit wherein the sum of a, b, c, and d equal one, wherein a, b, c, and d are each a value greater than or equal to zero and less than one, and at least two of a, b, c, and d are greater than zero;

b) a dispersant of Formula (II):

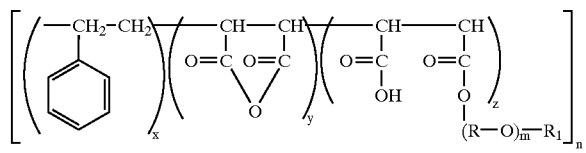

wherein in Formula (II):

R is a $C_{2-6}$ alkylene radical;

$R_1$ is a $C_{1-20}$ alkyl, $C_{6-9}$ cycloalkyl or phenyl group;

x, y, and z are a number from 0.01 to 100;

m is a number from 1 to 100; and n is a number from 10 to 100;

c) a dispersant of Formula (III):

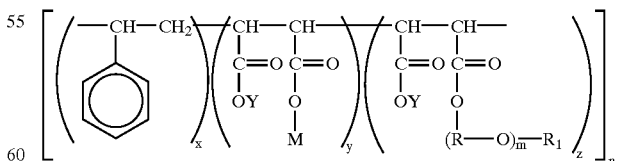

wherein in Formula (III):

M is hydrogen or the residue of a hydrophobic polyalkylene glycol or polysiloxane;

Y is hydrogen, an alkali or alkaline earth metal ion, ferrous ion, aluminum ion, (alkanol)ammonium ion, or (alkyl)ammonium ion;

R is a $C_{2-6}$ alkylene radical;

R1 is a $C_{1-20}$ alkyl, $C_{6-9}$ cycloalkyl, or phenyl group;

x, y, and z are numbers from 1 to 100;

d) a dispersant comprising at least one polymer or a salt thereof having the form of a copolymer of
   i) a maleic anhydride half-ester with a compound of the formula $RO(AO)_mH$, wherein R is a $C_1$–$C_{20}$ alkyl group, A is a $C_{2-4}$ alkylene group, and m is an integer from 2–16; and
   ii) a monomer having the formula $CH_2=CHCH_2-(OA)_nOR$, wherein n is an integer from 1–90 and R is a $C_{1-20}$ alkyl group;

e) a reaction product formed by reacting a polycarboxylic acid with a nitrogenous acrylic polymer;

f) a dispersant obtained by copolymerizing 5 to 98% by weight of an (alkoxy)polyalkylene glycol mono(meth)acrylic ester monomer (a) represented by the following general formula (1):

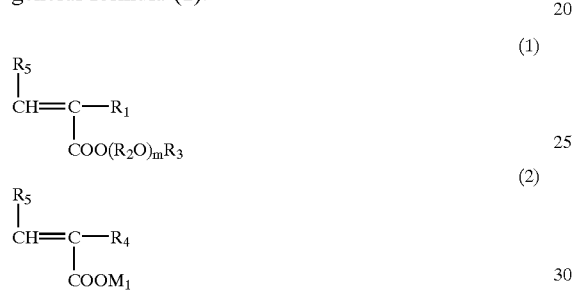

wherein $R_1$ stands for hydrogen atom or a methyl group, $R_2O$ for one species or a mixture of two or more species of oxyalkylene group of 2 to 4 carbon atoms, providing two or more species of the mixture may be added either in the form of a block or in a random form, $R_3$ for a hydrogen atom or an alkyl group of 1 to 5 carbon atoms, and m is a value indicating the average addition mol number of oxyalkylene groups that is an integer in the range of 1 to 100, 95 to 2% by weight of a (meth)acrylic acid monomer (b) represented by the above general formula (2), wherein $R_4$ and $R_5$ are each independently a hydrogen atom or a methyl group, and $M_1$ for a hydrogen atom, a monovalent metal atom, a divalent metal atom, an ammonium group, or an organic amine group, and 0 to 50% by weight of other monomer (c) copolymerizable with these monomers, provided that the total amount of (a), (b), and (c) is 100% by weight;

g) a graft polymer that is a polycarboxylic acid or a salt thereof, having side chains derived from at least one species selected from the group consisting of oligoalkyleneglycols, polyalcohols, and polyalkylene glycols;

h) a styrene-maleic anhydride copolymer in free acid or salt form, wherein the copolymer consists of the following monomer units and numbers of monomer units:

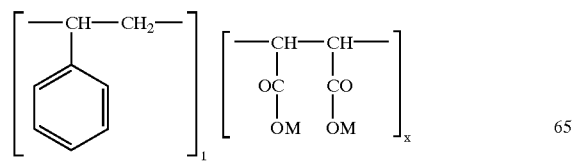

-continued

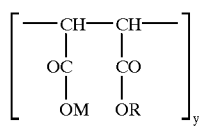

wherein:

M is selected from hydrogen, a cation or a residue of a hydrophobic polyalkylene glycol or polysiloxane;

R is the residue of a methylpoly(ethylene) glycol of weight average molecular weight 900–2000;

x=0.35–0.75; and y=0.25–0.65;

i) a reaction product of component A, optionally component B, and component C; wherein each component A is independently a nonpolymeric, functional moiety that adsorbs onto a cementitious particle, and contains at least one residue derived from a first component selected from the group consisting of phosphates, phosphonates, phosphinates, hypophosphites, sulfates, sulfonates, sulfinates, alkyl trialkoxy silanes, alkyl triacyloxy silanes, alkyl triaryloxy silanes, borates, boronates, boroxines, phosphoramides, amines, amides, quaternary ammonium groups, carboxylic acids, carboxylic acid esters, alcohols, carbohydrates, phosphate esters of sugars, borate esters of sugars, sulfate esters of sugars, salts of any of the preceding moieties, and mixtures thereof; wherein component B is an optional moiety, where if present, each component B is independently a nonpolymeric moiety that is disposed between the component A moiety and the component C moiety, and is derived from a second component selected from the group consisting of linear saturated hydrocarbons, linear unsaturated hydrocarbons, saturated branched hydrocarbons, unsaturated branched hydrocarbons, alicyclic hydrocarbons, heterocyclic hydrocarbons, aryl, phosphoester, nitrogen containing compounds, and mixtures thereof; and wherein component C is at least one moiety that is a linear or branched water soluble, nonionic polymer substantially non-adsorbing to cement particles, and is selected from the group consisting of poly(oxyalkylene glycol), poly(oxyalkylene amine), poly(oxyalkylene diamine), monoalkoxy poly(oxyalkylene amine), monoaryloxy poly(oxyalkylene amine), monoalkoxy poly(oxyalkylene glycol), monoaryloxy poly(oxyalkylene glycol), poly(vinyl pyrrolidones), poly(methyl vinyl ethers), poly(ethylene imines), poly(acrylamides), polyoxazoles, and mixtures thereof;

j) a dispersant of Formula (IV):

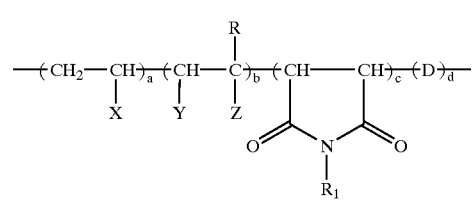

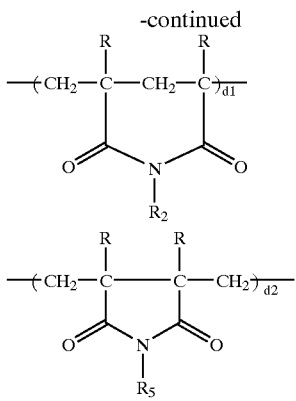

wherein in Formula (IV):
D = a component selected from the group consisting of the structure d1, the structure d2, and mixtures thereof;
X = H, $CH_3$, $C_2$ to $C_6$ Alkyl, Phenyl, p-Methyl Phenyl, Sulfonated Phenyl;
Y = H, —COOM;
R = H, $CH_3$;
Z = H, —$SO_3M$, —$PO_3M$, —COOM, —$OR_3$, —$COOR_3$, —$CH_2OR_3$, —$CONHR_3$, —CONHC$(CH_3)_2CH_2SO_3M$, —COO$(CHR_4)_n$OH where n = 2 to 6;
$R_1, R_2, R_3, R_5$ are each independently —$(CHRCH_2O)_m R_4$ random copolymer of oxyethylene units and oxypropylene units where m = 10 to 500 and wherein the amount of oxyethylene in the random copolymer is from about 60% to 100% and the amount of oxypropylene in the random copolymer is from 0% to about 40%;
$R_4$ = H, Methyl, $C_2$ to about $C_6$ Alkyl, about $C_6$ to about $C_{10}$ aryl;
M = H, Alkali Metal, Alkaline Earth Metal, Ammonium, Amine, triethanol amine, Methyl, $C_2$ to about $C_6$ Alkyl;
a = 0 to about 0.8;
b = about 0.2 to about 1.0;
c = 0 to about 0.5;
d = 0 to about 0.5; and
wherein a, b, c, and d represent the mole fraction of each unit and the sum of a, b, c, and d is 1.0;
k) a dispersant of Formula (V):

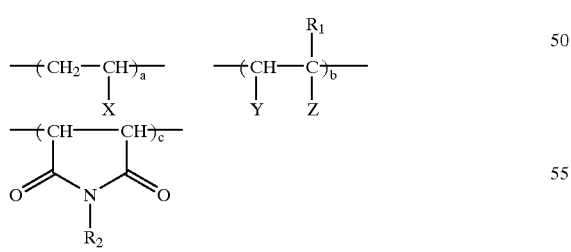

wherein in Formula (V):
the "b" structure is one of a carboxylic acid monomer, an ethylenically unsaturated monomer, or maleic anhydride wherein an acid anhydride group (—CO—O—CO—) is formed in place of the groups Y and Z between the carbon atoms to which the groups Y and Z are bonded respectively, and the "b" structure must include at least one moiety with a pendant ester linkage and at least one moiety with a pendant amide linkage;
X = H, $CH_3$, $C_2$ to $C_6$ Alkyl, Phenyl, p-Methyl Phenyl, p-Ethyl Phenyl, Carboxylated Phenyl, Sulfonated Phenyl;
Y = H, —COOM, —COOH, or W;
W = a hydrophobic defoamer represented by the formula $R_5O$—$(CH_2CH_2O)_s$—$(CH_2C(CH_3)HO)_t$—$(CH_2CH_2O)_u$ where s, t, and u are integers from 0 to 200 with the proviso that t > (s+u) and wherein the total amount of hydrophobic defoamer is present in an amount less than about 10% by weight of the polycarboxylate dispersant;
Z = H, —COOM, —$OR_3$, —$COOR_3$, —$CH_2OR_3$, or —$CONHR_3$;
$R_1$ = H, or $CH_3$;
$R_2, R_3$, are each independently a random copolymer of oxyethylene units and oxypropylene units of the general formula —$(CH(R_1)CH_2O)_m R_4$ where m = 10 to 500 and wherein the amount of oxyethylene in the random copolymer is from about 60% to 100% and the amount of oxypropylene in the random copolymer is from 0% to about 40%;
$R_4$ = H, Methyl, or $C_2$ to $C_8$ Alkyl;
$R_5$ = $C_1$ to $C_{18}$ alkyl or $C_6$ to $C_{18}$ alkyl aryl;
M = Alkali Metal, Alkaline Earth Metal, Ammonia, Amine, monoethanol amine, diethanol amine, triethanol amine, morpholine, imidazole;
a = 0.01–0.8;
b = 0.2–0.99;
c = 0–0.5; and
wherein a, b, c represent the mole fraction of each unit and the sum of a, b, and c, is 1;
l) a random copolymer corresponding to the following Formula (VI) in free acid or salt form having the following monomer units and numbers of monomer units:

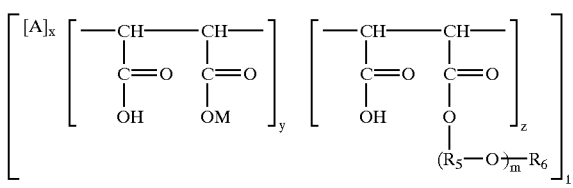

wherein A is selected from the moieties (i) or (ii)
(i) —$CR_1R_2$—$CR_3R_4$—

wherein $R_1$ and $R_3$ are selected from $C_{1-8}$ alkyl, $C_{2-8}$ alkenyl, $C_{2-8}$ alkylcarbonyl, $C_{1-8}$ alkoxy, carboxyl, hydrogen, or a ring wherein $R_1$ and $R_3$ can together with $R_2$ and/or $R_4$ form the ring; and $R_2$ and $R_4$ are selected from the group consisting of hydrogen and $C_{1-4}$ alkyl;
$R_7, R_8, R_9$, and $R_{10}$ are individually selected from the group consisting of hydrogen, $C_{1-6}$ alkyl, and a continuous $C_{2-8}$ hydrocarbon chain, wherein $R_1$ and $R_3$ together with $R_7$ and/or $R_8, R_9$, and $R_{10}$ form the continuous $C_{2-8}$ hydrocarbon chain joining the carbon atoms to which they are attached, the hydrocarbon chain optionally having at least one anionic group, wherein the at least one anionic group is optionally sulfonic;

M is selected from the group consisting of hydrogen, and the residue of a hydrophobic polyalkylene glycol or a polysiloxane, with the proviso that when A is (ii) and M is the residue of a hydrophobic polyalkylene glycol, M must be different from the group —($R_5$O)$_m$$R_6$;

$R_5$ is a $C_{2-8}$ alkylene radical;

$R_6$ is selected from the group consisting of $C_{1-20}$ alkyl, $C_{6-9}$ cycloalkyl and phenyl;

n, x, and z are numbers from 1 to 100;

y is 0 to 100;

m is 2 to 1000;

the ratio of x to (y+z) is from 1:10 to 10:1 and the ratio of y:z is from 5:1 to 1:100;

m) a copolymer of oxyalkyleneglycol-alkenyl ethers and unsaturated dicarboxylic acids, comprising:

i) 10 to 90 mol % of at least one component of the formula Ia or Ib:

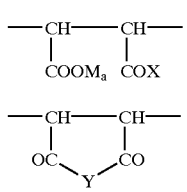

wherein M is a hydrogen atom, a mono- or divalent metal cation, an ammonium ion or an organic amine residue, a is 1, or when M is a divalent metal cation a is ½;

wherein X is —OM$_a$, —O—($C_m$H$_{2m}$O)$_n$—$R_1$ in which $R_1$ is a hydrogen atom, an aliphatic hydrocarbon radical containing from 1 to 20 carbon atoms, a cycloaliphatic hydrocarbon radical containing 5 to 8 carbon atoms or an optionally hydroxyl, carboxyl, or sulphonic substituted aryl radical containing 6 to 14 carbon atoms, m is 2 to 4, and n is 0 to 100, —NHR$_2$, —N(R$_2$)$_2$ or mixtures thereof in which R$_2$=R$_1$ or —CO—NH$_2$; and wherein Y is an oxygen atom or —NR$_2$;

ii) 1 to 89 mol % of components of the general formula:

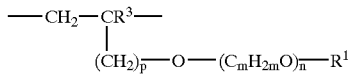

wherein R$_3$ is a hydrogen atom or an aliphatic hydrocarbon radical containing from 1 to 5 carbon atoms, p is 0 to 3, and R$_1$ is hydrogen, an aliphatic hydrocarbon radical containing from 1 to 20 carbon atoms, a cycloaliphatic hydrocarbon radical containing 5 to 8 carbon atoms or an optionally hydroxyl, carboxyl, or sulfonic substituted aryl radical containing 6 to 14 carbon atoms, m is 2 to 4, and n is 0 to 100, and iii) 0.1 to 10 mol % of components of the general formulae:

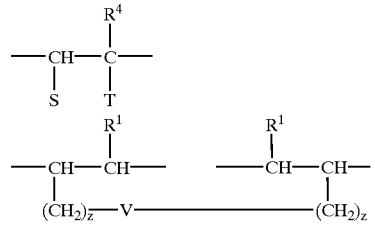

wherein S is a hydrogen atom or —COOM$_a$ or —COOR$_5$, T is —COOR$_5$, —W—R$_7$, —CO—[—NH—(CH2)3)—]$_s$—W—R$_7$, —CO—O—(CH$_2$)$_z$—W—R$_7$, a radical of the general formula:

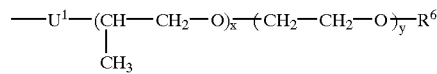

or —(CH$_2$)$_z$—V—(CH$_2$)$_z$—CH=CH—R$_1$, or when S is —COOR$_5$ or —COOM$_a$, U$_1$ is —CO—NHM—, —O— or —CH$_2$O, U$_2$ is —NH—CO—, —O— or —OCH$_2$, V is —O—CO—C$_6$H$_4$—CO—O— or —W—, and W is

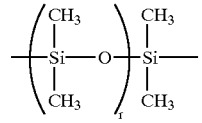

R4 is a hydrogen atom or a methyl radical, R5 is an aliphatic hydrocarbon radical containing 3 to 20 carbon atoms, a cycloaliphatic hydrocarbon radical containing 5 to 8 carbon atoms or an aryl radical containing 6 to 14 carbon atoms, R$_6$=R$_1$ or

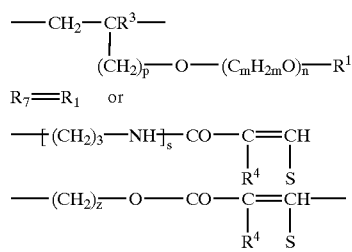

r is 2 to 100, s is 1 or 2, x is 1 to 150, y is o to 15 and z is 0 to 4.

15. The method of claim 14, wherein the solubilizing agent is at least one of:
a. block copolymers of ethylene oxide and propylene oxide;
b. acetylenic diols;
c. mono alkyl polyoxyalkylenes;
d. ethoxylated nonylphenols;
e. an alkyl-ether sulfonate represented by R$_1$—(OCH$_2$CH$_2$)$_n$—SO$_3$M, wherein R$_1$ is an alkyl with 6 to 18 carbon atoms, and n is an integer from 1 to 15;
f. an alkyl-ether carboxylate represented by R$_1$O(CHR$_2$CH$_2$O)$_n$CH$_2$CH$_2$COOM, wherein R$_1$ is a C$_4$–C$_{18}$ hydrocarbon, R$_2$=H or CH$_3$, n=1–30, m=H, Na, K, Li, Ca, Mg, amine, or ammonia; or g. a styrene-maleic copolymer given by the following formula:

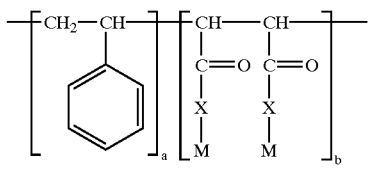

wherein M is independently at least one of H, Na, K, Ca, Mg, alkyl, hydroxyl alkyl, amino alkyl, alkylaryl, or an oxyalkylene group $(R_2O)_n$—$R_3$, wherein $R_2$ is a $C_2$–$C_4$ alkylene group, and $R_3$ is H or $C_1$–$C_{22}$ alkyl group, alkyl-aryl group, or aryl group, n=1–500, X is —O— or —$NHR_4$, with the proviso that an anhydride may be formed when X is —O—, and an imide ring may be formed when X is —$NHR_4$, and $R_4$ is H, alkyl, hydroxyl alkyl, amino alkyl, aryl, alkylaryl, or an oxyalkylene group $(R_2O)_n$—$R_3$.

16. The method of claim 14, wherein the water insoluble defoamer is at least one of a mineral oil, a vegetable oil, a fatty acid, a fatty acid ester, a hydroxyl functional compound, an amide, a phosphoric ester, a metal soap, a silicone, a polymer containing propylene oxide moieties, a hydrocarbon, or an acetylenic diol.

17. The method of claim 14, wherein the cement is selected from the group consisting of portland cement, masonry cement, alumina cement, refractory cement, magnesia cement, calcium sulfoaluminate cement, oil well cement, and mixtures thereof.

18. The method of claim 14 further comprising mixing a cement admixture or additive into the cementitious composition, wherein the cement admixture or additive is at least one of a set accelerator, a set retarder, an air entraining agent, an air detraining agent, a foaming agent, a corrosion inhibitor, another cement dispersing agent, a pigment, a pozzolan, clay, or aggregate.

19. The method of claim 18 wherein the aggregate is at least one of silica, quartz, crushed round marble, glass spheres, granite, limestone, calcite, feldspar, alluvial sands, or sand.

20. The method of claim 18, wherein the pozzolan is at least one of natural pozzolan, fly ash, silica fume, calcined clay, or blast furnace slag.

21. The method of claim 14, wherein the solubilizing agent is present in an amount sufficient to form a stable microemulsion.

22. The method of claim 14, wherein the solubilizing agent is present in an amount from about 0.25% to about 40% based on the weight of the dispersant for cementitious compositions.

23. The method of claim 14, wherein the water insoluble defoamer is present in an amount from about 0.01% to about 25% based on the weight of the dispersant for cementitious compositions.

24. The method of claim 14, wherein the water insoluble defoamer is present in an amount from about 0.25% to about 10% based on the weight of the dispersant for cementitious compositions.

25. The method of claim 14, wherein the water insoluble defoamer, the solubilizing agent capable of solubilizing the water insoluble defoamer, and the dispersant for cementitious compositions are added as one solution.

26. The method of claim 14, wherein the dispersant for cementitious compositions is present in an amount from about 0.01% to about 1% based on the weight of the cement.

27. The method of claim 14, wherein the dispersant for cementitious compositions is present in an amount from about 0.05% to about 0.5% based on the weight of the cement.

* * * * *